United States Patent
Tani et al.

(10) Patent No.: US 8,377,616 B2
(45) Date of Patent: Feb. 19, 2013

(54) AZO COMPOUND, AND PIGMENT DISPERSANT, PIGMENT COMPOSITION, PIGMENT DISPERSION AND TONER INCLUDING THE AZO COMPOUND

(75) Inventors: Yutaka Tani, Yokohama (JP); Masashi Hirose, Machida (JP); Takayuki Toyoda, Yokohama (JP); Yasuaki Murai, Kawasaki (JP); Masatake Tanaka, Yokohama (JP); Masashi Kawamura, Tokyo (JP); Kei Inoue, Yokohama (JP); Yuki Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/333,643

(22) Filed: Dec. 21, 2011

(65) Prior Publication Data
US 2012/0094226 A1  Apr. 19, 2012

Related U.S. Application Data

(63) Continuation of application No. PCT/JP2011/004592, filed on Aug. 16, 2011.

(30) Foreign Application Priority Data

Sep. 7, 2010  (JP) .................. 2010-199927

(51) Int. Cl.
*G03G 9/09* (2006.01)
*C08F 220/18* (2006.01)
*C08F 12/30* (2006.01)
*C08K 5/23* (2006.01)

(52) U.S. Cl. .................. 430/108.23; 534/573; 516/102; 106/31.28

(58) Field of Classification Search ............. 430/108.23; 534/573; 516/102; 106/31.28
See application file for complete search history.

(56) References Cited

U.S. PATENT DOCUMENTS

| | | | |
|---|---|---|---|
| 6,504,045 B2 | 1/2003 | Jung et al. |
| 6,586,151 B1 | 7/2003 | Naka et al. |
| 6,703,176 B2 | 3/2004 | Naka et al. |
| 6,803,164 B2 | 10/2004 | Mizoo et al. |
| 6,953,646 B2 | 10/2005 | Doujo et al. |
| 7,123,862 B2 | 10/2006 | Hasegawa et al. |
| 7,141,342 B2 | 11/2006 | Toyoda et al. |
| 7,160,660 B2 | 1/2007 | Dojo et al. |
| 7,264,910 B2 | 9/2007 | Toyoda et al. |
| 7,288,357 B2 | 10/2007 | Toyoda et al. |
| 7,368,211 B2 | 5/2008 | Hasegawa et al. |
| 7,470,494 B2 | 12/2008 | Nishiyama et al. |
| 7,582,152 B2 | 9/2009 | Jaunky et al. |
| 7,582,401 B2 | 9/2009 | Ogawa et al. |
| 7,678,524 B2 | 3/2010 | Hasegawa et al. |
| 7,704,659 B2 | 4/2010 | Ogawa et al. |
| 7,811,734 B2 | 10/2010 | Ogawa et al. |
| 7,833,685 B2 | 11/2010 | Tanaka et al. |
| 7,833,687 B2 | 11/2010 | Kato et al. |
| 7,939,231 B2 | 5/2011 | Ogawa et al. |
| 8,084,174 B2 | 12/2011 | Hasegawa et al. |
| 8,124,306 B2 | 2/2012 | Hirata et al. |
| 2009/0075193 A1 | 3/2009 | Murai et al. |
| 2011/0311910 A1 | 12/2011 | Matsui et al. |
| 2012/0040285 A1 | 2/2012 | Shibata et al. |

FOREIGN PATENT DOCUMENTS

| | | |
|---|---|---|
| JP | 2002-146227 A | 5/2002 |
| JP | 3721617 B2 | 11/2005 |
| JP | 3984840 B2 | 10/2007 |
| JP | 2009-501251 A | 1/2009 |
| WO | 99/42532 A1 | 8/1999 |
| WO | 2009/060886 A1 | 5/2009 |

OTHER PUBLICATIONS

"Experimental Chemistry Guide Book", Maruzen Bookstores Co., 1st version, vol. 17-2, pp. 162-179.
"New Experimental Chemistry Guide Book", Maruzen Bookstores Co., 1st version, vol. 15, pp. 390-448.
Ponde, et al., "Selective Catalytic Transesterification, Transthiolesterification, and Protection of Carbonyl Compounds over Natural Kaolinitic Clay", J. Org. Chem., vol. 63, No. 4, 1998, pp. 1058-1063.

Sai, et al., "Knorr Cyclizations and Distonic Superelectrophiles", J. Org. Chem., vol. 72, No. 25, 2007, pp. 9761-9764.
Sheenan, et al., "A Convenient Synthesis of Water-Soluble Carbodiimides", J. Org. Chem., vol. 26, No. 7, 1961 pp. 2525-2528.
Brandrup, et al., eds., Polymer Handbook, Third Edition, John Wiley & Sons, 1989, pp. 209-277.

*Primary Examiner* — Hoa V Le

(74) *Attorney, Agent, or Firm* — Fitzpatrick, Cella, Harper & Scinto

(57) ABSTRACT

There is provided a colorant compound improved in the dispersibility of an azo pigment into a water-insoluble solvent. The colorant compound is represented by the following general formula (1). $R_1$ denotes an alkyl group having 1 to 6 carbon atoms, or a phenyl group; $R_2$ to $R_6$ each denote a hydrogen atom, or a substituent represented by the following general formula (2); $R_7$ to $R_{11}$ each denote a hydrogen atom, a $COOR_{12}$ group, or a $CONR_{13}R_{14}$ group; and $R_{12}$ to $R_{14}$ each denote a hydrogen atom, or an alkyl group having 1 to 3 carbon atoms; and $P_1$ denotes a polymeric component; $L_1$ denotes an alkylene group having 1 to 3 carbon atoms or an arylene group having 6 to 10 carbon atoms; and * denotes a binding site.

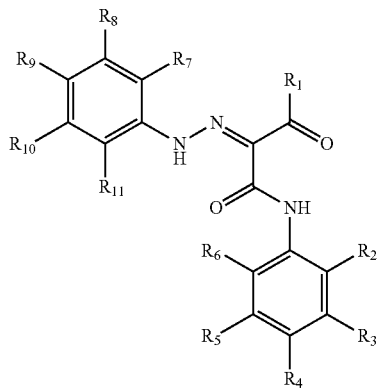

General formula (1)

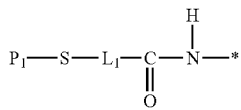

General formula (2)

11 Claims, 2 Drawing Sheets

AZO COMPOUND, AND PIGMENT DISPERSANT, PIGMENT COMPOSITION, PIGMENT DISPERSION AND TONER INCLUDING THE AZO COMPOUND

CROSS-REFERENCE TO RELATED APPLICATIONS

This application is a continuation of International Application No. PCT/JP2011/004592, filed Aug. 16, 2011, which claims the benefit of Japanese Patent Application No. 2010-199927, filed Sep. 7, 2010.

BACKGROUND OF THE INVENTION

1. Field of the Invention

The present invention relates to a novel azo compound, and a pigment dispersant, a pigment composition and a pigment dispersion including the azo compound. The present invention also relates to a toner including an azo pigment and a novel azo compound.

2. Description of the Related Art

A fine pigment is likely to have a strong cohesive force between pigment particles in a medium such as an organic solvent or a melted resin. Therefore, color unevenness and a remarkable decrease in coloring power are brought about in drawdowns in some cases. A further problem that occurs is a decrease in gloss of colored surfaces and coated surfaces of drawdowns.

As a method of improving the pigment dispersibility, polymer dispersants having sites having high affinity for pigments and polymer sites to impart the dispersibility in media have conventionally been used.

As a polymeric pigment dispersant for a toner, an example is disclosed which uses a dispersant in which an azo or disazo chromophore containing a substitution product of acetoacetanilides is bonded to a polymer (see Japanese Patent No. 03984840). An example is disclosed which uses Solsperse® (made by Lubrizol Corp.) as a comb polymeric dispersant having an acid or basic site (see WO 99-42532).

On the other hand, an example is disclosed which uses a polymer dispersant as a dispersant of a pigment for inkjet recording in which polymer dispersant a chromophore having a lower molecular weight than 95% of the molecular weight of an azo pigment is bonded to a water-soluble polymer main chain (see U.S. Pat. No. 7,582,152).

SUMMARY OF THE INVENTION

Although propositions as described above have been made, for the cases where toners are produced using these pigment dispersants, it is difficult to provide sufficient pigment dispersibility in binder resins, and it is difficult to obtain desired color tones.

The present invention is directed to solve the above-mentioned problems.

That is, the present invention is directed to provide a pigment dispersant concurrently having high affinity for pigments, and high solubility to polymerizable monomers, binder resins, water-insoluble solvents and the like. The present invention also has an object to provide a toner having good color tone by applying a pigment composition containing the pigment dispersant and a pigment to a coloring agent for a toner.

The above-mentioned problems can be solved by the following present invention.

According to one aspect of the present invention, there is provided an azo compound represented by the following general formula (1).

General formula (1)

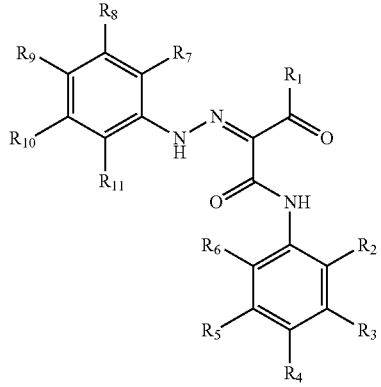

wherein $R_1$ denotes an alkyl group having 1 to 6 carbon atoms, or a phenyl group; $R_2$ to $R_6$ each denote a hydrogen atom, or a substituent represented by the following general formula (2), and at least one of $R_2$ to $R_6$ is a substituent represented by the following general formula (2); $R_7$ to $R_{11}$ each denote a hydrogen atom, a $COOR_{12}$ group, or a $CONR_{13}R_{14}$ group, and at least one of $R_7$ to $R_{11}$ is a $COOR_{12}$ group, or a $CONR_{13}R_{14}$ group; and $R_{12}$ to $R_{14}$ each denote a hydrogen atom, or an alkyl group having 1 to 3 carbon atoms.

General formula (2)

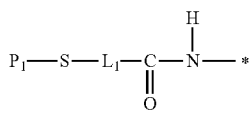

wherein $P_1$ denotes a polymeric component; $L_1$ denotes an alkylene group having 1 to 3 carbon atoms or an arylene group having 6 to 10 carbon atoms; and * denotes a binding site.

According to another aspect of the present invention, there is provided a pigment dispersant, a pigment dispersion and a toner including at least a novel azo compound represented by the general formula (1) shown above.

According to the present invention, a novel azo compound is provided. The azo compound according to the present invention and represented by the general formula (1) shown above, since having affinity for water-insoluble solvents, especially non-polar solvents, and high affinity for azo pigments, especially acetoacetanilide-based pigments, provides a pigment composition improved in the dispersibility of azo pigments by using the azo compound as a pigment dispersant. Also a pigment dispersion excellent in the dispersibility into water-insoluble solvents, especially a pigment dispersion of a styrene monomer, is provided. Use of an azo pigment and the novel azo compound further provides a toner good in the color tone.

Further features of the present invention will become apparent from the following description of exemplary embodiments with reference to the attached drawings.

DESCRIPTION OF THE EMBODIMENTS

Figure 1:
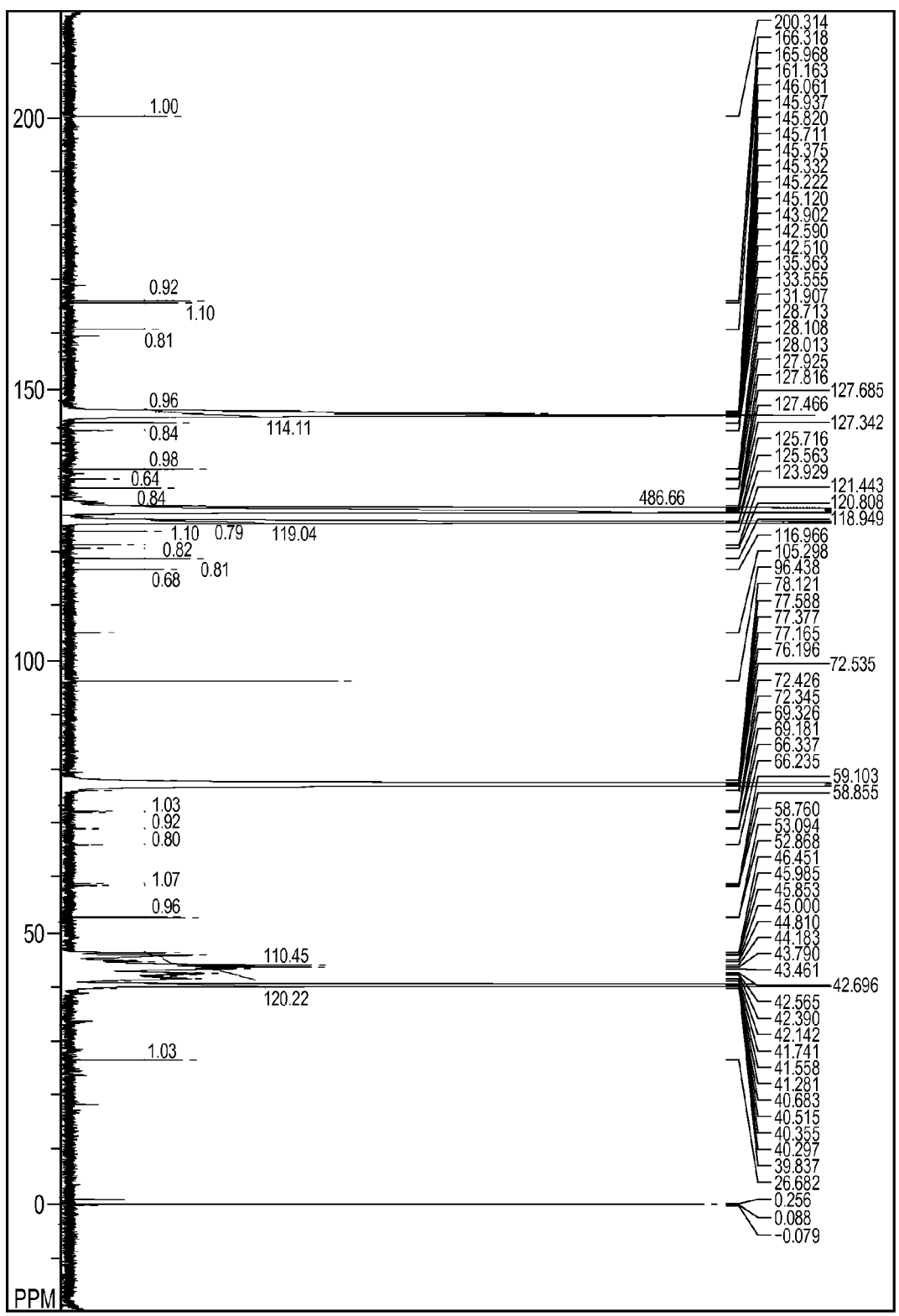
FIG. 1 is a $^{13}$C-NMR spectrum diagram of an azo compound (24) in the present invention.

Hereinafter, the present invention will be described in detail.

As a result of exhaustive studies to solve the above-mentioned problems of conventional technologies, the present inventors have found that an azo compound represented by the general formula (1) shown below has high affinity for azo pigments and water-insoluble solvents, and improves the dispersibility of azo pigments into water-insoluble solvents. It has been found also that the use of the azo compound provides an azo pigment composition good in the dispersibility. It has been further found that the use of an azo pigment and the azo compound provides a toner good in the color tone. These findings have led to the present invention.

The azo compound according to the present invention includes a colorant site (a moiety excluding a moiety represented by the general formula (2) in a compound represented by the general formula (1)) having high affinity for azo pigments, and a polymer site represented by the general formula (2) and having high affinity for water-insoluble solvents.

General formula (1)

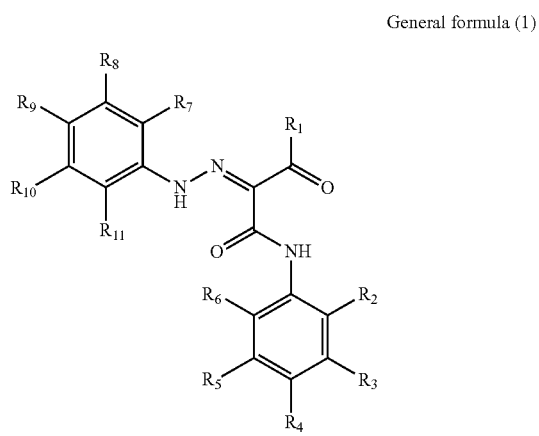

wherein $R_1$ denotes an alkyl group having 1 to 6 carbon atoms, or a phenyl group; $R_2$ to $R_6$ each denote a hydrogen atom, or a substituent represented by the following general formula (2), and at least one of $R_2$ to $R_6$ is a substituent represented by the following general formula (2); $R_7$ to $R_{11}$ each denote a hydrogen atom, a $COOR_{12}$ group, or a $CONR_{13}R_{14}$ group, and at least one of $R_7$ to $R_{11}$ is a $COOR_{12}$ group, or a $CONR_{13}R_{14}$ group; and $R_{12}$ to $R_{14}$ each denote a hydrogen atom, or an alkyl group having 1 to 3 carbon atoms.

General formula (2)

wherein $P_1$ denotes a polymeric component; $L_1$ denotes an alkylene group having 1 to 3 carbon atoms or an arylene group having 6 to 10 carbon atoms; and * denotes a binding site.

First, the color site will be described in detail.

An alkyl group in $R_1$ in the general formula (1) shown above is not especially limited as long as having 1 to 6 carbon atoms, but examples thereof include straight chain, branched chain or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

$R_1$ in the general formula (1) shown above may have a substituent unless remarkably inhibiting affinity for pigments. In this case, the substituent includes a halogen atom, a nitro group, an amino group, a hydroxyl group, a cyano group and a trifluoromethyl group.

$R_1$ in the general formula (1) shown above is desirably a methyl group from the viewpoint of affinity for pigments.

In the azo compound according to the present invention, at least one of $R_2$ to $R_6$ in the general formula (1) shown above is a substituent represented by the general formula (2) shown above, and the remainder of $R_2$ to $R_6$ is a hydrogen atom. The substitution position is desirably the $R_4$-position.

With respect to $R_7$ to $R_{11}$ in the general formula (1) shown above, at least one thereof can be selected so as to be a $COOR_{12}$ group or a $CONR_{13}R_{14}$ group from a hydrogen atom, a $COOR_{12}$ group and a $CONR_{13}R_{14}$ group. It is desirable that $R_7$ and $R_{10}$ are each a $COOR_{12}$ group, and $R_8$, $R_9$ and $R_{11}$ are each a hydrogen atom, from the viewpoint of affinity for pigments.

Examples of an alkyl group in $R_{12}$ to $R_{14}$ in the general formula (1) shown above include a methyl group, an ethyl group, a n-propyl group and an isopropyl group.

With respect to $R_{12}$ to $R_{14}$ in the general formula (1) shown above, it is desirable that $R_{12}$ is a methyl group, and that $R_{13}$ and $R_{14}$ are both a methyl group, or one thereof is a methyl group and the other thereof is a hydrogen atom, from the viewpoint of affinity for pigments.

Then, a polymer site represented by the general formula (2) will be described.

A polymer site represented by the general formula (2) shown above forms a covalent bond at the "*" site in the formula and the $R_2$ to $R_6$-position of a colorant site.

An alkylene group in $L_1$ in the general formula (2) shown above is not especially limited, but an alkylene group having 1 to 3 carbon atoms is desirable, and examples thereof include a methylene group, an ethylene group, a propylene group and a trimethylene group, from the viewpoint of the availability of raw materials and the easiness of the synthesis.

An arylene group in $L_1$ in the general formula (2) shown above is not especially limited, but an arylene group having 6 to 10 carbon atoms is desirable, and examples thereof include an o-phenylene group, a m-phenylene group, a p-phenylene group, a 2,6-naphthylene group and 2,7-naphthylene group.

With respect to a polymer site represented by the general formula (2) shown above, it is desirable that a polymeric component $P_1$ in the general formula (2) contains at least one of either one partial structural formula of the following general formula (3) and general formula (4) from the viewpoint of holding high affinity for water-insoluble solvents.

General formula (3)

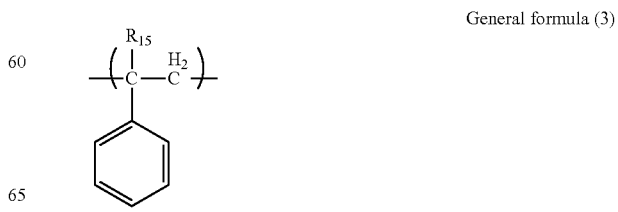

wherein $R_{15}$ denotes a hydrogen atom or an alkyl group having 1 or 2 carbon atoms.

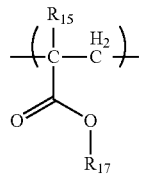

General formula (4)

wherein $R_{16}$ denotes a hydrogen atom or an alkyl group having 1 or 2 carbon atoms; and $R_{17}$ denotes an alkyl group having 1 to 22 carbon atoms or an aralkyl group having 7 or 8 carbon atoms.

Examples of an alkyl group in $R_{15}$ in the general formula (3) shown above include a methyl group and an ethyl group.

$R_{15}$ in the general formula (3) shown above is desirably a hydrogen atom or a methyl group from the viewpoint of copolymerizability.

Examples of an alkyl group in $R_{16}$ in the general formula (4) shown above include a methyl group and an ethyl group.

$R_{16}$ in the general formula (4) shown above is desirably a hydrogen atom or a methyl group from the viewpoint of copolymerizability.

Examples of an alkyl group in $R_{17}$ in the general formula (4) shown above include straight chain, branched chain or cyclic alkyl groups such as a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, an isopropyl group, an isobutyl group, a sec-butyl group, a tert-butyl group, a 2-ethylhexyl group, a cyclopropyl group, a cyclobutyl group, a cyclopentyl group and a cyclohexyl group. Above all, alkyl groups having 4 or more and 22 or less carbon atoms are desirable from the viewpoint of affinity for water-insoluble solvents.

Examples of an aralkyl group in $R_{17}$ in the general formula (4) shown above include a benzyl group and a phenethyl group.

A polymeric component represented by $P_1$ in the general formula (2) shown above may contain other copolymerization components unless not remarkably inhibiting affinity for dispersion media. Other than the monomer imparting the partial structure of the general formula (3) or general formula (4), usable examples thereof are methacrylamides such as methacrylamide, N-methylmethacrylamide, N-ethylmethacrylamide, N-isopropylmethacrylamide, N,N-dimethylmethacrylamide and N,N-diethylmethacrylamide, acrylamides such as acrylamide, N-methylacrylamide, N-ethylacrylamide, N-isopropylacrylamide, N,N-dimethylacrylamide and N,N-diethylacrylamide, vinylbenzoic acids such as 3-vinylbenzoic acid and 4-vinylbenzoic acid, vinylsulfonic acids such as vinylsulfonic acid and styrenesulfonic acid, alkylsulfonic acid methacrylates or alkylsulfonic acid methacrylamides such as methacryloxypropylsulfonic acid, 2-hydroxy-3-methacryloxypropylsulfonic acid, 2-methacryloylamino-2,2-dimethylethanesulfonic acid, 2-methacryloxyethanesulfonic acid, 2-methacrylamide-2-methylpropanesulfonic acid and 3-methacrylamide-2-hydroxypropanesulfonic acid, and alkylsulfonic acid acrylates or alkylsulfonic acid acrylamides such as acryloxypropylsulfonic acid, 2-hydroxy-3-acryloxypropylsulfonic acid, 2-acryloylamino-2,2-dimethylethanesulfonic acid, 2-acryloxyethanesulfonic acid, 2-acrylamide-2-methylpropanesulfonic acid and 3-acrylamide-2-hydroxypropanesulfonic acid, vinyl alcohols such as vinyl alcohol, hydroxyalkyl methacrylates such as 2-hydroxyethyl methacrylate, 2 (or 3)-hydroxypropyl methacrylate, 2 (or 3 or 4)-hydroxybutyl methacrylate and cyclohexanedimethanol monomethacrylate, hydroxyalkyl acrylates such as 2-hydroxyethyl acrylate, 2 (or 3)-hydroxypropylacrylate, 2 (or 3 or 4)-hydroxybutylacrylate and cyclohexanedimethanol monoacrylate, hydroxyalkyl methacrylamides such as N-(2-hydroxyethyl)methacrylamide, N-(2-hydroxypropyl)methacrylamide and N-(2-hydroxybutyl)methacrylamide, hydroxyalkylacrylamides such as N-(2-hydroxyethyl)acrylamide, N-(2-hydroxypropyl)acrylamide and N-(2-hydroxybutyl)acrylamide, vinylpyridines such as 2-vinylpyridine, 4-vinylpyridine, 5-methyl-2-vinylpyridine and 5-ethyl-2-vinylpyridine, and vinylpyrrolidones such as 1-vinyl-2-pyrrolidone, 1-vinyl-3-pyrrolidone, 3-vinyl-2-pyrrolidone, 4-vinyl-2-pyrrolidone and 5-vinyl-2-pyrrolidone.

In these monomers, the proportion of a monomer imparting a partial structure of the general formula (3) or general formula (4) is desirably 70 mol % or more.

The affinity of a polymeric component represented by $P_1$ in the general formula (2) shown above for dispersion media can be controlled by varying proportions of the monomer units represented by the general formula (3) and general formula (4) shown above constituting the polymeric component. In the case where the dispersion medium is a non-polar solvent like styrene, making large the proportion of a partial structure of the general formula (3) is desirable from the viewpoint of affinity for the dispersion medium. In the case where the dispersion medium is a solvent having a polarity of some degree like acrylate esters, making large the proportion of a partial structure represented by the general formula (4) is desirable similarly from the viewpoint of affinity for the dispersion medium.

The molecular weight of a polymeric component represented by $P_1$ in the general formula (2) shown above is desirably a case where the number-average molecular weight (Mn) is 500 or higher from the viewpoint of improving the dispersibility of pigments. Although a higher molecular weight has a larger effect of improving the dispersibility of pigments, too high a molecular weight decreases the affinity for water-insoluble solvents, which is not desirable. Therefore, the number-average molecular weight of the polymeric component represented by $P_1$ in the general formula (2) shown above is desirably 200,000 or lower. Additionally, in consideration of the easiness of the production, the number-average molecular weight thereof is more desirably in the range of 2,000 to 50,000.

Examples of the polymerization form of a polymeric component represented by $P_1$ in the general formula (2) shown above include random copolymers, alternating copolymers, periodic copolymers and block copolymers.

In an azo compound represented by the general formula (1) shown above, although tautomers having structures of the following general formulae (6) and (7) and others are present as shown in the scheme described below, these tautomers are also included within the scope of the right of the present invention.

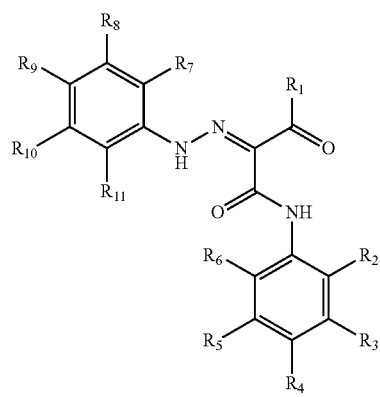
General formula (1)
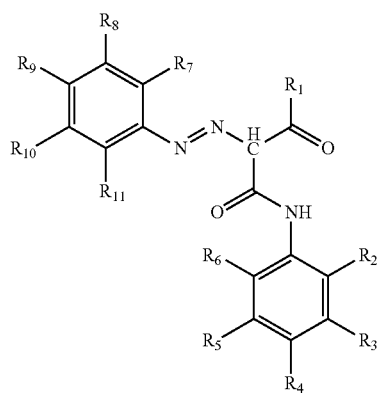
General formula (6)
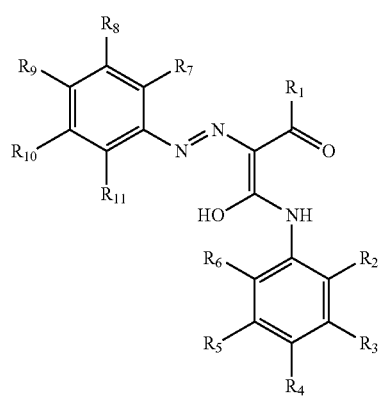
General formula (7)
wherein in the general formulae (6) and (7), $R_1$ to $R_{11}$ are each the same meaning as $R_1$ to $R_{11}$ in the general formula (1).
Then, a production method of the azo compound (1) according to the present invention will be described in detail.

The azo compound according to the present invention and represented by the general formula (1) can be synthesized based on a well-known production method. An example of the synthesis scheme will be shown below.

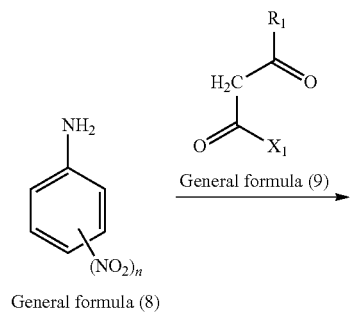

General formula (8)

General formula (9)

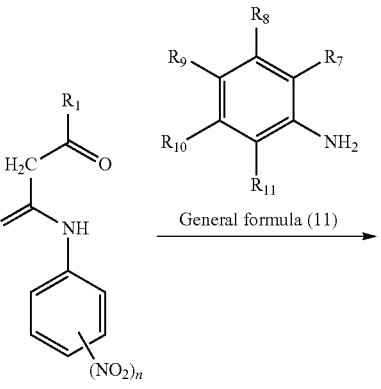

General formula (10)

General formula (11)

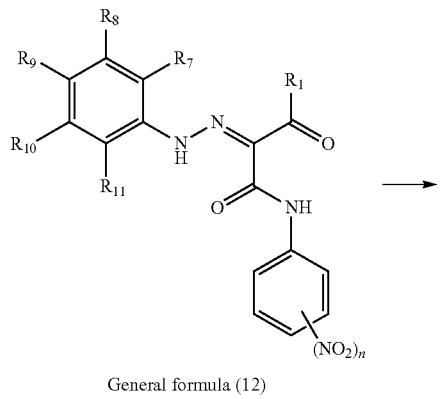

General formula (12)

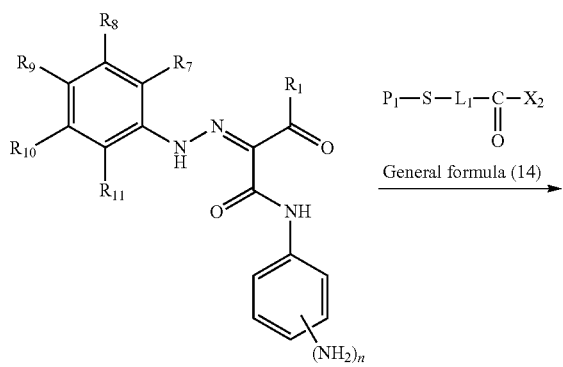

General formula (13)

General formula (14)

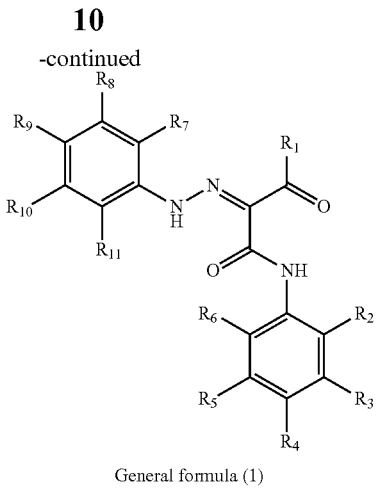

General formula (1)

wherein n in the general formulae (8), (10), (12) and (13) is 1 or 2; $R_1$ in the general formulae (9), (10), (12) and (13) each denote the same meaning as $R_1$ in the general formula (1) shown above; $X_1$ in the general formula (9) denotes a leaving group; $R_7$ to $R_{11}$ in the general formulae (11) to (13) denote the same meaning as $R_7$ to $R_{11}$ in the general formula (1); $P_1$ and $L_1$ in the general formula (14) are the same meaning as $P_1$ and $L_1$ in the general formula (2); and $X_2$ in the general formula (14) denotes a leaving group.

In the scheme exemplified above, the azo compound (1) according to the present invention is synthesized through Step 1 in which a raw material (8) and a raw material (9) are amidated to synthesize an intermediate (10) being an acetoacetanilide analogue, Step 2 in which the intermediate (10) and a raw material (11) are diazo coupled to synthesize an intermediate (12), Step in which the intermediate (12) being a nitrobenzene analogue is reduced to synthesize an intermediate (13) being an aniline analogue, and Step 4 in which the intermediate (13) and an intermediate (14) synthesized separately and having a polymer site are amidated.

First, Step 1 will be described. For Step 1, a well-known method can be utilized (for example, Datta E. Ponde, and four authors et al., "The Journal of Organic Chemistry", (US) American Chemical Society, 1998, vol. 63, No. 4, pp. 1058-1063). In the case where $R_1$ in the general formula (9) is a methyl group, the synthesis can be carried out by a method using a diketene in place of the raw material (9) (for example, Kiran Kumar Solingapuram Sai, and two authors et al., "The Journal of Organic Chemistry", (US) American Chemical Society, 2007, vol. 72, No. 25, pp. 9761-9764).

The raw materials (8) and (9) are each commercially available as various types, and easily available. Alternatively, these can be easily synthesized by well-known methods.

Although the present step can be carried out solventlessly, the step is desirably carried out in the presence of a solvent in order to prevent a rapid progress of the reaction. The solvent is not especially limited unless inhibiting the reaction, but examples thereof include alcohols such as methanol, ethanol and propanol, esters such as methyl acetate, ethyl acetate and propyl acetate, ethers such as diethyl ether, tetrahydrofuran and dioxane, hydrocarbons such as benzene, toluene, xylene, hexane and heptane, halogenated hydrocarbons such as dichloromethane, dichloroethane and chloroform, amides such as N,N-dimethylformamide and N,N-dimethylimidazolidinone, nitriles such as acetonitrile and propionitrile, acids such as formic acid, acetic acid and propionic acid, and water. These solvents may be used as a mixture of two or more, and the mixing ratio when the solvents are mixed and used can be optionally determined depending on the solubility of a substrate. The use amount of the solvent can be optionally determined, but the amount is desirably in the range of 1.0 to 20 times the mass of the amount of a compound represented by the general formula (8) shown above.

The present step is usually carried out in the temperature range of 0° C. to 250° C., and usually completed in 24 hours.

Then, Step 2 will be described. In Step 2, a well-known method can be utilized. A specific example thereof includes the following method. First, the raw material (11) is reacted with a diazotizing agent such as sodium nitrite or nitrosyl sulfate in a methanol solvent in the presence of an inorganic acid such as hydrochloric acid or sulfuric acid to synthesize a corresponding diazonium salt. The diazonium salt is further coupled with the intermediate (10) to synthesize the intermediate (12).

The raw material (11) is commercially available as various types, and easily available. Alternatively, this can be easily synthesized by well-known methods.

Although the present step can be carried out solventlessly, the step is desirably carried out in the presence of a solvent in order to prevent a rapid progress of the reaction similarly to Step 1.

The present step is usually carried out in the temperature range of −50° C. to 100° C., and usually completed in 24 hours.

Then, Step 3 will be described. In Step 3, a well-known method can be utilized (as a method of using a metallic compound or the like, for example, a method described in "Experimental Chemistry Guide Book", published by Maruzen Bookstores Co., 1st. version, vol. 17-2, pp. 162-179 (in Japanese); and as a method of catalytic hydrogenation, for example, methods described in "New Experimental Chemistry Guide Book", published by Maruzen Bookstores Co., 1st. version, vol. 15, pp. 390-448 (in Japanese), and WO 2009-060886).

Although Step 3 can be carried out solventlessly, the step is desirably carried out in the presence of a solvent in order to prevent a rapid progress of the reaction similarly to Step 1. Although the solvent is similar to the case of Step 1, it is better not to use halogenated hydrocarbons.

The present step is usually carried out in the temperature range of 0° C. to 250° C., and usually completed in 24 hours.

Then, Step 4 will be described. In Step 4, a well-known method can be utilized (as a method of using a clay mineral or the like, for example, a method described in Datta E. Ponde, and four authors et al., "The Journal of Organic Chemistry", (US) American Chemical Society, 1998, vol. 63, No. 4, pp. 1058-1063; and as a method of using 1-ethyl-3-(3-dimethylaminopropyl)carbodiimide hydrochloric acid salt or the like, for example, a method described in John C. Sheehan, and two authors et al., "Journal of Organic Chemistry", (US) American Chemical Society, 1961, vol. 26, No. 7, pp. 2525-2528.

Although the present step also can be carried out solventlessly, the step is desirably carried out in the presence of a solvent in order to prevent a rapid progress of the reaction similarly to Step 1.

The present step is usually carried out in the temperature range of 0° C. to 250° C., and usually completed in 24 hours.

For the compounds represented by the general formulae (1), (10), (12) and (13) shown above and obtained in each step, usual isolation and purification methods of organic compounds can be used. Examples of the isolation and purification methods include a recrystallization method and a reprecipitation method using an organic solvent, and a column chromatography using silica gel or the like. By purifying the compound by these methods singly or in combination of two or more, the compound can be obtained in a high purity.

The compounds represented by the general formulae (10), (12) and (13) shown above and obtained in the steps described above were identified and quantitatively determined by a nuclear magnetic resonance spectroscopic analysis [ECA-400 (made by JEOL Ltd.)], an ESI-TOF MS [LC/MSD TOF (made by Agilent Technologies, Inc.)], and a HPLC analysis [LC-20A (made by Shimadzu Corp.)].

The compound represented by the general formula (1) shown above and obtained in the step described above was identified and quantitatively determined by a high-performance GPC [HLC8220GPC (made by Tosoh Corp.)], a nuclear magnetic resonance spectroscopic analysis [FT-NMR AVANCE-600 (made by Bruker Biospin GmbH)], and a measurement of an acid value based on JIS K-0070 [an automatic titrator COM-2500 (made by Hiranuma Sangyo Co., Ltd.)].

Then, a production method of the intermediate (14) shown above having a polymer site containing a monomer unit will be described in detail.

The intermediate (14) can be synthesized based on a well-known production method. An example of a synthesis scheme is shown below.

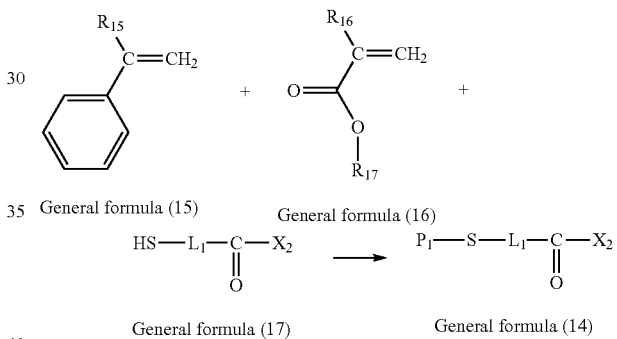

General formula (15)    General formula (16)

General formula (17)    General formula (14)

wherein $R_{15}$ in the general formula (15) denotes the same meaning as $R_{15}$ in the general formula (3) shown above; $R_{16}$ and $R_{17}$ in the general formula (16) denote the same meaning as $R_{16}$ and $R_{17}$ in the general formula (4) shown above; $L_1$ in the general formula (17) is the same meaning as $L_1$ in the general formula (2) shown above; and $X_2$ in the general formula (17) is the same meaning as $X_2$ in the general formula (14) shown above.

In the scheme exemplified above, a step of polymerization reacting a raw material (15), a raw material (16) and a raw material (17) synthesizes the intermediate (14) having the polymer site containing a monomer unit according to the present invention.

A method of the polymerization reaction includes radical polymerization, anionic polymerization and cationic polymerization, but is desirably radical polymerization from the viewpoint of the industrial productivity.

Since the intermediate (14) has a structure having a substituent to form the azo compound (1) according to the present invention by the reaction with the intermediate (13), at one terminal of the polymer site, the polymerization reaction is desirably a polymerization reaction in which such a structural control is easy. From these viewpoints, a method of the polymerization reaction for the present step is desirably a radical polymerization reaction using a chain transfer agent having a reactive substituent; further from the viewpoint of the easiness of availability of the raw materials and the synthesis, a radical polymerization reaction is more desirable which uses a mercaptane-based chain transfer agent having a carboxylic acid derivative such as a carboxylic acid group or a carboxylate ester group.

For the present step, a well-known method of the polymerization reaction can be utilized (for example, Japanese Patent No. 03721617). A specific example thereof includes a method of radical polymerization reacting polymerizable monomers of the general formulae (15) and (16) shown above, which have a vinyl group, in a tetrahydrofuran solvent in the presence of a mercaptane-based chain transfer agent (17) having a carboxylic acid derivative such as a carboxylic acid group or a carboxylate ester group, to synthesize the intermediate (14) described above.

An initiation reaction of the radical polymerization suffices if the reaction can generate a radical species and initiate a vinyl polymerization reaction, and examples thereof include use of a radical polymerization initiator, irradiation of radiation, laser light or the like, heating of a reaction system, and a combination thereof and the like.

The radical polymerization initiator can be selected from compounds to generate radicals by the action of heat, light, radiation, a redox reaction or the like, and examples thereof include azo compounds, organic peroxides, inorganic peroxides, organometal compounds and photopolymerization initiators. More specific examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile) and dimethyl 2,2'-azobis(isobutyrate), organic peroxide-based polymerization initiators such as benzoyl peroxide, di-tert-butyl peroxide, tert-butylperoxyisopropyl monocarbonate, tert-hexyl peroxybenzoate and tert-butyl peroxybenzoate, inorganic peroxide-based polymerization initiators such as potassium persulfate and ammonium persulfate, and redox initiators such as a hydrogen peroxide-ferric system, a BPO-dimethylaniline system and a cerium (IV) salt-alcohol-based system. The photopolymerization initiators include acetophenones, benzoin ethers and ketals. These methods may be used singly or in combination of two or more.

Examples of a mercaptane-based chain transfer agent represented by the general formula (17) described above include mercaptoacetic acid, 2-mercaptopropionic acid, 3-mercaptopropionic acid, 3-mercaptoisobutyric acid, methyl 3-mercaptopropionate, 2-ethylhexyl 3-mercaptopropionate, 4-mercaptobenzoic acid, thiosalicylic acid and thiomalic acid. If the use amount of a mercaptane-based chain transfer agent described above is too small, an effect as a chain transfer agent is not sufficiently exhibited and there arise some cases where the molecular weight of the polymer site becomes excessively high as described above; and if the use amount of a chain transfer agent is too large, the molecular weight decreases in some cases. The use amount by mass of a mercaptane-based chain transfer agent described above is desirably in the range of 1.0 to 10 times the mass of the monomers shown above.

In the polymerization reaction, by controlling the charge amounts of the general formulae (15) and (16) shown above, the proportions of partial structural formulae represented by the general formulae (3) and (4) shown above constituting the polymeric component represented by $P_1$ in the general formula (14) shown above can be varied. The charge amounts can be determined according to a polarity of a dispersion medium when an azo compound of the general formula (1) shown above is used as a dispersant.

Since the present step mixes and copolymerizes monomers having different polarities, the reaction is carried out desirably in a solvent having affinity for the each monomer. Usable examples of the solvent are specifically polar solvents including alcohols such as methanol, ethanol, and 2-propanol, ketones such as acetone, methyl ethyl ketone and methyl isobutyl ketone, ethers such as tetrahydrofuran and diethyl ether, ethylene glycol mono-alkyl ethers or acetates thereof, propylene glycol mono-alkyl ethers or acetates thereof, and diethylene glycol mono-alkyl ethers, or nonpolar solvents such as toluene and xylene, and these solvents may be used singly or as a mixture thereof. Among these, solvents whose boiling points are in the temperature range of 100 to 180° C. are more desirably used singly or as a mixture thereof. These solvents can be used as a mixture of two or more, and the mixing ratio in the mixing use can be determined optionally according to the solubility of a substrate.

A suitable temperature range of the present step varies depending on the type of the radical polymerization reaction. Specifically, the polymerization is carried out generally in the temperature range of −30 to 200° C., and more desirably in the temperature range of 40 to 180° C.

For the intermediate (14) obtained in the present step, as required, usual isolation and purification methods of organic compounds can be used. Examples of the isolation and purification methods include a recrystallization method and a reprecipitation method using an organic solvent, and a column chromatography using silica gel or the like. By carrying out the purification by these methods singly or in combination of two or more, the intermediate (14) can be obtained in a high purity.

The intermediate (14) obtained in the present step was identified and quantitatively determined by a high-performance GPC [HLC8220GPC (made by Tosoh Corp.)], a nuclear magnetic resonance spectroscopic analysis [FT-NMR AVANCE-600 (made by Bruker Biospin GmbH)], and a measurement of an acid value based on JIS K-0070 [an automatic titrator COM-2500 (made by Hiranuma Sangyo Co., Ltd.)].

Then, the pigment dispersant and the pigment composition according to the present invention will be described. Since the azo compound according to the present invention and represented by the general formula (1) shown above exhibits high affinity for azo pigments, especially acetoacetanilide-based pigments, and also high affinity for water-insoluble solvents, the azo compound can be used as a pigment dispersant. In this case, an azo compound represented by the general formula (1) may be used singly, or may be concurrently with compounds included in the range of the general formula (1).

The pigment composition according to the present invention includes a pigment dispersant described above together with a pigment. The pigment composition is used for coatings, inks, toners and resin molded products.

A pigment includes monoazo-based pigments, disazo-based pigments and polyazo-based pigments. Among these, acetoacetanilide-based pigments represented by C. I. Pigment Yellow 74, C. I. Pigment Yellow 93, C. I. Pigment Yellow 128, C. I. Pigment Yellow 155 and C. I. Pigment Yellow 180 are preferable because having stronger affinity for the pigment dispersant according to the present invention. Especially C. I. Pigment Yellow 155 represented by the following formula (5) is preferable because of a high dispersion effect by an azo compound represented by the general formula (1) shown above according to the present invention. These pigments may be used singly or as a mixture of two or more.

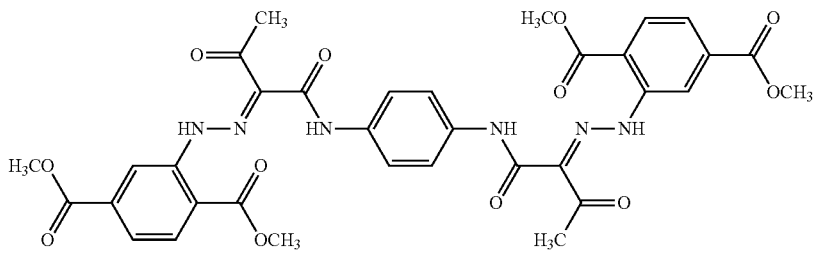

Formula (5)

Also pigments other than the above-mentioned yellow pigments are suitably used in the case where the pigments have affinity for the pigment dispersant according to the present invention, and are not limited. Examples thereof include azo pigments such as C. I. Pigment Orange 1, 5, 13, 15, 16, 34, 36, 38, 62, 64, 67, 72 and 74; C. I. Pigment Red 2, 3, 4, 5, 12, 16, 17, 23, 31, 32, 41, 17, 48, 48:1, 48:2, 53:1, 57:1, 112, 144, 146, 166, 170, 176, 185, 187, 208, 210, 220, 221, 238, 242, 245, 253, 258, 266 and 269; C. I. Pigment Violet 13, 25, 32 and 50; C. I. Pigment Blue 25 and 26; and C. I. Pigment Brown 23, 25 and 41.

These may be crude pigments, or may be prepared pigment compositions unless remarkably inhibiting the effect of the pigment dispersant according to the present invention.

The compositional ratio in terms of mass of a pigment and a pigment dispersant in the pigment composition according to the present invention is desirably in the range of 100:0.1 to 100:20. The ratio is more desirably in the range of 100:1 to 100:10. If the amount of a pigment dispersant is too small, an objective dispersion effect is low; and if the amount is too large, a dispersion effect can be attained, but the contribution of a color of the pigment dispersant becomes large, and problems such as a decrease in distinctness arise.

A pigment composition can be produced in a wet system or a dry system. Since the azo compound according to the present invention has a high affinity for water-insoluble solvents, the production in a wet system, which can simply produce homogeneous pigment compositions, is preferable. Specifically, a pigment composition can be obtained, for example, as follows. In a dispersion medium, a pigment dispersant, and a resin according to needs are dissolved, and a pigment powder is gradually added thereto under stirring to be sufficiently adapted to the dispersion medium. Further addition of a mechanical shearing force by a disperser, such as a kneader, a roll mill, a ball mill, a paint shaker, a dissolver, an attritor, a sand mill or a high-speed mill, can cause the pigment dispersant to be adsorbed on the surface of the pigment particles, and disperse the pigment into a stable and homogeneous fine particle form.

To the pigment composition according to the present invention, auxiliary agents may further be added during the production. The auxiliary agents are specifically, for example, surfactants, pigment and non-pigment dispersants, fillers, standardizers, resins, waxes, defoaming agents, antistatics, dustproof agents, extenders, shading coloring agents, preservatives, drying inhibitors, rheology control additives, humectants, antioxidants, UV absorbents, photostabilizers, and combinations thereof. The pigment dispersant according to the present invention may be beforehand added in production of a crude pigment.

Then, the pigment dispersion according to the present invention will be described. The pigment dispersion according to the present invention includes the pigment composition described above and a water-insoluble solvent. The pigment composition may be dispersed in the water-insoluble solvent, or each constituting component of the pigment composition may be dispersed in the water-insoluble solvent. Specifically, for example, a pigment dispersion can be obtained as follows. In a water-insoluble solvent, a pigment dispersant and a resin are dissolved according to needs, and a pigment or a pigment composition powder is gradually added thereto under stirring to be sufficiently adapted to the water-insoluble, solvent. Further addition of a shearing force by a disperser, such as a ball mill, a paint shaker, a dissolver, an attritor, a sand mill or a high-speed mill, can disperse the pigment into a stable and homogeneous fine particle form.

A water-insoluble solvent usable for the pigment dispersion according to the present invention can be decided according to the purposes and applications of the pigment dispersion, and is not especially limited. Specific examples thereof include esters such as methyl acetate, ethyl acetate and propyl acetate, hydrocarbons such as hexane, octane, petroleum ether, cyclohexane, benzene, toluene and xylene, and halogenated hydrocarbons such as carbon tetrachloride, trichloroethylene and tetrabromoethane.

Further, a water-insoluble solvent usable for the pigment dispersion according to the present invention may be a polymerizable monomer. Specific examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, octyl methacrylate, dodecyl methacrylate, 2-ethylhexyl methacrylate, stearyl methacrylate, phenyl methacrylate, dimethylaminoethyl methacrylate, diethylaminoethyl methacrylate, methyl acrylate, ethyl acrylate, butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile and acrylamide.

To the pigment dispersion according to the present invention, a resin may be added. A resin usable is decided according to the purpose and applications of the pigment dispersion, and is not especially limited. Specific examples thereof include polystyrene resins, styrene copolymers, polyacrylic acid resins, polymethacrylic acid resins, polyacrylate ester resins, polymethacrylate ester resins, acrylate ester copolymers, methacrylate ester copolymers, polyester resins, polyvinyl ether resins, polyvinyl alcohol resins and polyvinyl butyral resins. Additionally, polyurethane resins and polypeptide resins are included. These resins may be used as a mixture of two or more.

Then, the toner according to the present invention will be described.

The pigment composition according to the present invention can be suitably used as a coloring agent for a toner including toner particles containing at least a binder resin, the coloring agent, a wax component and the like. By using the pigment composition according to the present invention, since the pigment composition has high affinity of a pigment for the binder resin and can hold a state that the pigment is stably and finely dispersed, a toner having a good color tone can be obtained.

A binder resin used for toner particles constituting the toner according to the present invention includes styrene-methacrylic acid copolymers, styrene-acrylic acid copolymers, polyester resins, epoxy resins and styrene-butadiene copolymers, which are generally used therefor. In a method of obtaining toner particles directly by a polymerization method, a monomer to form the toner particles is used. Preferably used monomers are, specifically, styrenic monomers such as styrene, α-methylstyrene, α-ethylstyrene, o-methylstyrene, m-methylstyrene, p-methylstyrene, o-ethylstyrene, m-ethylstyrene and p-ethylstyrene, methacrylate ester monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile and methacrylic acid amide, acrylate ester monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile and acrylic acid amide, and olefinic monomers such as butadiene, isoprene and cyclohexene. These monomers are used singly, or suitably mixed and used so that the theoretical glass transition temperature (Tg) is in the range of 40 to 75° C. (see "Polymer Handbook", edited by J. Brandrup and E. H. Immergut, $3^{rd}$ edit., John Wiley & Sons, 1989, 209-277 (in US)).

A binder resin in the toner according to the present invention can control the distribution in the toner of additives such as a coloring agent, a charge control agent and a wax, by using a nonpolar resin such as polystyrene and concurrently a polar resin such as a polyester resin or a polycarbonate resin together. For example, in the case where toner particles are produced directly by a suspension polymerization method or the like, the polar resin is added during the polymerization reaction from a dispersion step to a polymerization step. The polar resin is added according to a balance in polarities of a polymerizable monomer composition to become toner particles and an aqueous medium. As a result, the polar resin concentration can be controlled so as to continuously vary from the toner particle surface to the center thereof, including formation of a thin layer of the polar resin on the toner particle surface. At this time, by using such a polar resin to interact with a coloring agent including the pigment composition according to the present invention and with a charge control agent and the like, the presence state of the coloring agent, the charge control agent and the like in the toner particle can be made to be a desirable form.

From the viewpoint of improving the mechanical strength of toner particles constituting the toner according to the present invention, and controlling the molecular weight of a binder resin, as required, a well-known crosslinking agent may be used in the synthesis of the binder resin.

The crosslinking agent is desirably in the range of 0.05 to 10 parts by mass, and more desirably in the range of 0.1 to 5 parts by mass with respect to 100 parts by mass of the monomers described above.

As a coloring agent used for toner particles constituting the toner according to the present invention, although at least the pigment composition according to the present invention is used, another coloring agent can be used concurrently unless inhibiting the affinity of the azo compound according to the present invention for a pigment. Examples of the another coloring agent include compounds represented by condensed azo compounds, isoindolinone compounds, anthraquinone compounds, azo metal complexes, methyne compounds and allylamide compounds, and other various types of substances.

A wax component used in toner particles constituting the toner according to the present invention specifically includes petroleum wax such as paraffin wax, microcrystalline wax and petrolatum and derivatives thereof, montan wax and derivatives thereof, hydrocarbon waxes by a Fischer-Tropsch process and derivatives thereof, polyolefin waxes represented by polyethylene, and derivatives thereof, and natural waxes such as carnauba wax and candelilla wax, and derivatives thereof, and these derivatives include oxides, block copolymers with vinyl monomers and graft modified materials. Additionally, wax components include alcohols such as higher aliphatic alcohols, fatty acids such as stearic acid and palmitic acid, fatty acid amides, fatty acid esters, hardened castor oil and derivatives thereof, vegetable waxes and animal waxes. These may be used singly or concurrently.

The total addition amount of wax components is desirably in the range of 2.5 to 15.0 parts by mass, and more desirably in the range of 3.0 to 10.0 parts by mass, with respect to 100 parts by mass of a binder resin.

In the toner according to the present invention, a charge control agent can be mixed as required. Thereby, an optimum triboelectric charge amount can be controlled according to a development system.

As the charge control agent, well-known ones can be utilized, and a charge control agent is especially preferable in which the charging speed is high, and a constant charge amount can be maintained stably. Additionally, in the case where toner particles are produced by a direct polymerization method, a charge control agent is especially preferable which exhibits low polymerization inhibition and contains substantially no soluble material to an aqueous medium.

In the toner according to the present invention, an inorganic fine powder may be added as a fluidizing agent to the toner particles. The inorganic fine powders usable are fine powders of silica, titanium oxide, alumina and double oxides thereof, surface-treated materials thereof, and the like.

A production method of toner particles constituting the toner according to the present invention includes a pulverization method, a suspension polymerization method, a suspension granulation method and an emulsion polymerization method, which are conventionally used. The toner particles are desirably obtained especially by a method of granulating in an aqueous medium, such as a suspension polymerization method and a suspension granulation method, among those production methods, from the viewpoint of the environmental load on production and the controllability of the particle size.

In the case of using the suspension polymerization method, toner particles can be produced for example, as follows. First, a coloring agent including the pigment composition according to the present invention, a polymerizable monomer, a wax component, a polymerization initiator and the like are mixed to prepare a polymerizable monomer composition. Then, the polymerizable monomer composition is dispersed in an aqueous medium to granulate particles of the polymerizable monomer composition. Then, the polymerizable monomer in the particles of the polymerizable monomer composition is polymerized in an aqueous medium to obtain toner particles.

The polymerizable monomer composition in the step described above is desirably prepared by mixing a dispersion liquid in which the coloring agent is dispersed in a first polymerizable monomer, with a second polymerizable monomer. That is, after the coloring agent including the pigment composition according to the present invention is fully dispersed in the first polymerizable monomer, the dispersion liquid is mixed with the second polymerizable monomer together with other toner materials, whereby the toner particles are obtained in which a pigment is present in a better dispersion state.

A polymerization initiator used in the suspension polymerization method includes well-known polymerization initiators, and examples thereof include azo compounds, organic peroxides, inorganic peroxides, organometallic compounds and photopolymerization initiators.

The concentration of the polymerization initiator is desirably in the range of 0.1 to 20 parts by mass, and more desirably in the range of 0.1 to 10 parts by mass, with respect to 100 parts by mass of polymerizable monomers. The kind of the polymerization initiator differs slightly depending on a polymerization method, but polymerization initiators are used singly or as a mixture thereof with reference to the 10-hour half life temperature.

An aqueous medium used in the suspension polymerization method desirably includes a dispersion stabilizer. As the dispersion stabilizer, well-known inorganic and organic dispersion stabilizers can be used.

In the present invention, among the dispersion stabilizers described above, a hardly water-soluble inorganic dispersion stabilizer soluble to acids is desirably used. Further in the present invention, in the case where an aqueous medium is prepared using the hardly water-soluble inorganic dispersion stabilizer, the dispersion stabilizer is used in a proportion in the range of 0.2 to 2.0 parts by mass with respect to 100 parts by mass of polymerizable monomers desirably from the viewpoint of the liquid droplet stability of the polymerizable monomer composition in the aqueous medium. Still further in the present invention, an aqueous medium is desirably prepared using water in the range of 300 to 3,000 parts by mass with respect to 100 parts by mass of the polymerizable monomer composition.

Toner particles can also be produced by a suspension granulation method. Since the production step of the suspension granulation method has no heating step, the compatibilization of a resin with a wax component, which is caused in the case of using a low-melting point wax, is suppressed and a decrease in the glass transition temperature of the toner due to the compatibilization can be prevented. Additionally, since the suspension granulation method has a broad option of a toner material to become a binder resin, the method can easily adopt a polyester resin, which is considered to be generally advantageous in fixability, as a main component. Therefore, the suspension granulation method is an advantageous method in the case where a toner having a resin composition which cannot adopt a suspension polymerization method is produced.

Toner particles produced by using the suspension granulation method can be produced, for example, as follows.

First, a coloring agent including the pigment composition according to the present invention, a binder resin, a wax component, and the like are mixed in a solvent to prepare a solvent composition. Then, the solvent composition is dispersed in a medium which is not compatible with the solvent to granulate particles of the solvent composition to obtain a toner particle suspension liquid. Then, the obtained suspension liquid is heated or depressurized to remove the solvent to obtain toner particles.

The solvent composition in the step described above is preferably prepared by mixing a dispersion liquid in which the coloring agent is dispersed in a first solvent, with a second solvent. That is, after the coloring agent including the pigment composition according to the present invention is fully dispersed in the first solvent, the dispersion liquid is mixed with the second solvent together with other toner materials, whereby the toner particles are obtained in which a pigment is present in a better dispersion state.

Examples of a solvent usable in the suspension granulation method include hydrocarbons such as toluene, xylene and hexane, halogenated hydrocarbons such as methylene chloride, chloroform, dichloroethane, trichloroethane and carbon tetrachloride, alcohols such as methanol, ethanol, butanol and isopropyl alcohol, polyhydric alcohols such as ethylene glycol, propylene glycol, diethylene glycol and triethylene glycol, cellosolves such as methyl cellosolve and ethyl cellosolve, ketones such as acetone, methyl ethyl ketone and methyl isobutyl ketone, ethers such as benzyl alcohol ethyl ether, benzyl alcohol isopropyl ether and tetrahydrofuran, and esters such as methyl acetate, ethyl acetate, and butyl acetate. These may be used singly or as a mixture of two or more. Among these, in order to easily remove a solvent in the toner particle suspension liquid, the solvent is preferably used which has a low boiling point and can sufficiently dissolve the binder resin.

The use amount of the solvent is preferably in the range of 50 to 5,000 parts by mass, and more preferably in the range of 120 to 1,000 parts by mass, with respect to 100 parts by mass of a binder resin.

A medium used in the suspension granulation method desirably includes a dispersion stabilizer. As the dispersion stabilizer, well-known inorganic and organic dispersion stabilizers can be used.

The use amount of the dispersion stabilizer is desirably in the range of 0.01 to 20 parts by mass with respect to 100 parts by mass of a binder resin from the viewpoint of the liquid droplet stability of the solvent composition in an aqueous medium.

In the present invention, a desirable range of the weight-average particle diameter (hereinafter, D4) of a toner is in the range of 3.00 to 15.0 µm, and more preferably in the range of 4.0 to 12.0 µm from the viewpoint of being capable of acquiring a good charging stability and a high-definition image.

The ratio (hereinafter, D4/D1) of D4 of a toner to the number-average particle diameter (hereinafter, D1) thereof is 1.35 or less, and desirably 1.30 or less.

The regulation method of D4 and D1 of the toner according to the present invention varies depending on a production method of the toner particles. For example, in the case of the suspension polymerization method, D4 and D1 can be regulated by controlling the concentration of a dispersant used in the preparation of an aqueous dispersion medium, the stirring speed in the reaction, the stirring time in the reaction and the like.

The toner according to the present invention may be either of a magnetic one and a nonmagnetic one. In the case of using the toner as a magnetic one, the toner particles constituting the toner according to the present invention may use a mixed magnetic material. Such a magnetic material includes iron oxides such as magnetite, maghemite and ferrite, iron oxides including other metal oxides, metals such as Fe, Co and Ni, alloys of these metals with a metal such as Al, Co, Cu, Pb, Mg, Ni, Sn, Zn, Sb, Be, Bi, Cd, Ca, Mn, Se, Ti, W and V, and mixtures thereof.

Hereinafter, measurement methods used in the present Examples will be described.

(1) Measurement of a Molecular Weight Distribution

The molecular weight distributions of the polymer site and the colorant site according to the present invention were calculated in terms of polystyrene from a size-exclusion chromatography (SEC). The measurement of the molecular weight distribution by SEC was carried out as follows.

A solution, obtained by adding a sample to an eluate described below so that the sample concentration was 1.0% by mass, and leaving the solution at rest at room temperature for 24 hours, was filtered with a solvent-resistive membrane filter having a pore diameter of 0.2 µm to make a sample solution, which was measured by the following conditions.

High-performance GPC apparatus: HLC8220GPC (made by Tosoh Corp.)
Column: two series of TSKgel α-M (made by Tosoh Corp.)
Eluate: DMF (containing 20 mmol/l LiBr)
Flow rate: 1.0 ml/min
Oven temperature: 40° C.
Sample injection amount: 0.10 ml For the calculation of the molecular weight of a sample, a molecular weight calibration curve fabricated using standard polystyrene resins [TSK standard polystyrenes: F-850, F-450, F-288, F-128, F-80, F-40, F-20, F-10, F-4, F-2, F-1, A-5000, A-2500, A-1000 and A-500 (made by Tosoh Corp.)] was used.

(2) Measurement of an Acid Value

The acid value of a polymer in the present invention was determined by the following method.

The basic operation was according to JIS K-0070.

1) 0.5 to 2.0 g of a sample was precisely weighed. The mass at this time was taken as W (g).

2) The sample was put in a 300-ml beaker, and 150 ml of a mixed liquid of toluene/ethanol (4/1) was added to dissolve the sample.

3) The titration was carried out using a 0.1-mol/l-KOH ethanol solution and using a potentiometric titrator [for example, an automatic titrator COM-2500 (made by Hiranuma Sangyo Co., Ltd.)].

4) The use amount of the KOH solution at this time was taken as S (ml). The blank value was measured simultaneously, and the use amount of the KOH solution at this time was taken as B (ml).

5) The acid value was calculated by the following expression. f was a factor of the KOH solution.

$$\text{Acid value (mgKOH/g)} = \{(S-B) \times f \times 5.61\}/W$$

(3) Compositional Analysis

The determination of the structure of a polymer produced was carried out by a $^{13}C$ NMR measurement using the following apparatus.

FT-NMR apparatus: AVANCE-600 (made by Bruker Biospin GmbH) (solvent used: heavy chloroform)

In the $^{13}C$ NMR, the quantification was carried out by an inverse gated decoupling method, in which chromium (III) acetylacetonate was used as a relaxation reagent, for the compositional analysis.

(4) Measurements of a Weight-Average Particle Diameter D4 and a Number-Average Particle Diameter D1 of a Toner The measurement used a Coulter Multisizer (made by Coulter Scientific Instruments Japan, Inc.), to which an interface (made by Nikkaki Bios Co., Ltd.) to output the number distribution and the volume distribution and a personal computer were connected. A 1% NaCl aqueous solution of a first class grade sodium chloride was used as an electrolytic solution, but for example, ISOTON®-II (made by Coulter Scientific Instruments Japan, Inc.) could be used. The specific measurement procedure was described in a catalogue (2002 February version) of Coulter Multisizer published by Coulter Scientific Instruments Japan, Inc., and in an operation manual of the measurement instrument, but as follows.

2 to 20 mg of a measurement sample was added to 100 to 150 ml of the electrolyte aqueous solution. The electrolytic solution in which the sample was suspended was subjected to a dispersion treatment for about 1 to 3 min by an ultrasonic disperser; and the number and the volume of toner particles of 2.0 µm or larger and 64.0 µm or smaller were measured using an aperture of 100 µm of the Coulter Multisizer. The obtained data were distributed into 16 channels to determine the weight-average particle diameter D4, the number-average particle diameter D1, and D4/D1.

EXAMPLES

Then, the present invention will be described more specifically by way of Examples, but the scope of the present invention is not limited thereto. Provided that "parts" and "%" in the description are in terms of mass unless otherwise specified.

According to the following methods, polymeric components ($P_1$) having partial structures represented by the general formulae (3) and (4) shown above, and polymer sites including a connecting site ($L_1$) with a colorant site, and a terminal carboxylic acid site were synthesized.

Synthesis Example 1

Synthesis of Polymer (A)

100 parts of propylene glycol monomethyl ether was heated under nitrogen replacement, and refluxed at a solution temperature of 120° C. or higher. A mixture of 100 parts of styrene with 1.2 parts of β-mercaptopropionic acid and 1.0 part of tert-butyl peroxybenzoate [an organic peroxide-type polymerization initiator, Perbutyl Z® (made by NOF Corp.)] was dropped thereto over 3 hours. After the completion of the dropping, the solution was stirred for 3 hours, and thereafter, while the solution temperature was being raised to 170° C., the solution was subjected to a normal-pressure distillation, and after the solution temperature reached 170° C., the solution was vaporized for 1 hour at 1 hPa under reduced pressure to distil away the solvent, to obtain a polymer solid material. The solid material was dissolved in tetrahydrofuran, and reprecipitated with n-hexane, and a deposited solid was filtered off to obtain Polymer (A).

[Analysis Results of Polymer (A)]

[1] The result by GPC: the number-average molecular weight (Mn)=10,450

[2] The data analysis result of $^{13}C$-NMR (600 MHz, $CDCl_3$, room temperature): from the quantification results of a polymeric component site composed of the styrene and the number of carbon atoms constituting a β-mercaptopropionic acid site, and from the measurement result of the number-average molecular weight, the number of the unit of the general formula (3) constituting Polymer (A) was 100 in average.

[3] The measurement result of the acid value: 5.0 mgKOH/g

Synthesis Example 2

Synthesis of Polymer (B)

100 parts of propylene glycol monomethyl ether was heated under nitrogen replacement, and refluxed at a solution temperature of 120° C. or higher. A mixture of 80 parts of styrene with 20 parts of butyl acrylate, 1.2 parts of β-mercaptopropionic acid and 1.0 part of tert-butyl peroxybenzoate [an organic peroxide-type polymerization initiator, Perbutyl Z® (made by NOF Corp.)] was dropped thereto over 3 hours. After the completion of the dropping, the solution was stirred for 3 hours, and thereafter, while the solution temperature was being raised to 170° C., the solution was subjected to a normal-pressure distillation, and after the solution temperature reached 170° C., the solution was vaporized for 1 hour at 1 hPa under reduced pressure to distil away the solvent, to obtain a polymer solid material. The solid material was dissolved in tetrahydrofuran, and reprecipitated with n-hexane, and a deposited solid was filtered off to obtain Polymer (B).

[Analysis Results of Polymer (B)]
[1] The result by GPC: the number-average molecular weight (Mn)=10,110
[2] The data analysis result of $^{13}$C-NMR (600 MHz, CDCl$_3$, room temperature): from the quantification results of a polymeric component site composed of the styrene and butyl acrylate and the number of carbon atoms constituting a β-mercaptopropionic acid site, and from the measurement result of the number-average molecular weight, the numbers of the units of the general formulae (3) and (4) constituting Polymer (B) were 79 and 20 in average.
[3] The measurement result of the acid value: 5.0 mgKOH/g

Synthesis Example 3

Synthesis of Polymer (C)

100 parts of propylene glycol monomethyl ether was heated under nitrogen replacement, and refluxed at a solution temperature of 120° C. or higher. A mixture of 50 parts of styrene and 1.0 part of tert-butyl peroxybenzoate [an organic peroxide-type polymerization initiator, Perbutyl Z® (made by NOF Corp.)] was dropped thereto over 2 hours. After the completion of the dropping, the solution was stirred for 3 hours, and the solution temperature was cooled to room temperature to obtain a polymer solution. The number-average molecular weight of a polymer at this time was 4,610.

Then, 300 parts of propylene glycol monomethyl ether was added to the polymer solution, and heated under nitrogen replacement, and refluxed at a solution temperature of 120° C. or higher. A mixture of 60 parts of butyl acrylate, 1.2 parts of β-mercaptopropionic acid and 1.0 part of tert-butyl peroxybenzoate [an organic peroxide-type polymerization initiator, Perbutyl Z® (made by NOF Corp.)] was dropped thereto over 2 hours; after the completion of the dropping, the solution was stirred for 3 hours, and thereafter, while the solution temperature was being raised to 170° C., the solution was subjected to a normal-pressure distillation, and after the solution temperature reached 170° C., the solution was vaporized for 1 hour at 1 hPa under reduced pressure to distil away the solvent, to obtain a polymer solid material. The solid material was dissolved in tetrahydrofuran, and reprecipitated with n-hexane, and a deposited solid was filtered off to obtain Polymer (C).

[Analysis Results of Polymer (C)]
[1] The result by GPC: the number-average molecular weight (Mn)=11,750
[2] The data analysis result of $^{13}$C-NMR (600 MHz, CDCl$_3$, room temperature): from the quantification results of a polymeric component site composed of the styrene and butyl acrylate and the number of carbon atoms constituting a β-mercaptopropionic acid site, and from the measurement result of the number-average molecular weight, the numbers of the units of the general formulae (3) and (4) constituting Polymer (C) were 44 and 56, respectively, in average.
[3] The measurement result of the acid value: 5.0 mgKOH/g Polymers (D) to (S) represented by the general formula (2) shown above were synthesized by the similar operations as in Synthesis Examples of Polymers (A), (B) and (C) described above. A list of these Synthesis Examples is shown in the following Table 1, but synthesis examples are not limited to the examples described below. In Table 1, "Bn" denotes an unsubstituted benzyl group. "Random" of a polymerization form denotes a copolymer in which the arrangement of monomer units represented by the general formulae (3) and (4) shown above is random; and "block" denotes a block copolymer of a unit represented by the general formula (3) and a unit represented by the general formulae (4).

TABLE 1

| | POLYMER SITES | | | | | | |
|---|---|---|---|---|---|---|---|
| Polymer | Number of a General Formula (3) Unit | Number of a General Formula (4) Unit | $R_{15}$ | $R_{16}$ | $R_{17}$ | $L_1$ | Polymerization Form |
| Polymer (A) | 100 | 0 | H | — | — | —CH$_2$CH$_2$— | random |
| Polymer (B) | 74 | 19 | H | H | C$_4$H$_9$ | —CH$_2$CH$_2$— | random |
| Polymer (C) | 44 | 56 | H | H | C$_4$H$_9$ | —CH$_2$CH$_2$— | block |
| Polymer (D) | 19 | 89 | H | H | C$_4$H$_9$ | —CH$_2$CH$_2$— | random |
| Polymer (E) | 0 | 100 | — | H | C$_4$H$_9$ | —CH$_2$CH$_2$— | random |
| Polymer (F) | 78 | 22 | H | CH$_3$ | C$_{18}$H$_{37}$ | —CH$_2$CH$_2$— | random |
| Polymer (G) | 75 | 28 | H | H | C$_{22}$H$_{45}$ | —CH$_2$CH$_2$— | random |
| Polymer (H) | 53 | 49 | H | H | CH$_3$ | —CH$_2$CH$_2$— | random |
| Polymer (I) | 72 | 28 | H | H | Bn | —CH$_2$CH$_2$— | random |
| Polymer (J) | 100 | 0 | CH$_3$ | — | — | —CH(CH$_3$)— | random |
| Polymer (K) | 19 | 89 | H | H | C$_4$H$_9$ | —CH(CH$_3$)— | random |
| Polymer (L) | 100 | 0 | C$_2$H$_5$ | — | — | —CH$_2$CH(CH$_3$)—* | random |
| Polymer (M) | 74 | 19 | C$_2$H$_5$ | H | C$_4$H$_9$ | —CH$_2$CH(CH$_3$)—* | random |
| Polymer (N) | 73 | 21 | H | C$_2$H$_5$ | C$_4$H$_9$ | —CH$_2$— | random |
| Polymer (O) | 19 | 89 | H | H | C$_4$H$_9$ | —CH$_2$— | random |

TABLE 1-continued

| | | POLYMER SITES | | | | | |
|---|---|---|---|---|---|---|---|
| Polymer | Number of a General Formula (3) Unit | Number of a General Formula (4) Unit | $R_{15}$ | $R_{16}$ | $R_{17}$ | $L_1$ | Polymerization Form |
| Polymer (P) | 100 | 0 | H | — | — | 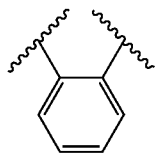 [SMILES: *c1ccccc1*] | random |
| Polymer (Q) | 72 | 17 | H | H | $C_4H_9$ | 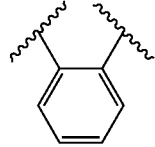 [SMILES: *c1ccccc1*] | random |
| Polymer (R) | 100 | 0 | H | — | — | 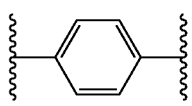 [SMILES: *c1ccc(*)cc1] | random |
| Polymer (S) | 71 | 20 | H | H | $C_4H_9$ | 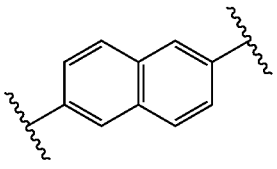 [SMILES: *c1ccc2cc(*)ccc2c1] | random |

**is a binding site with (i) of a partial structure in the general formula (2) shown on the right. $P_1$—S—(i)

***is a binding site with (ii) of a partial structure in the general formula (2) shown on the right.

(ii) 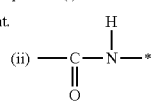

Example 1

Azo compounds represented by the general formula (1) shown above according to the present invention were synthesized according to the following method.

Synthesis Example 4

Synthesis of an Azo Compound (24)

An azo compound (24), in which in the general formula (1), $R_2, R_3, R_5, R_6, R_8, R_9$ and $R_{11}$ were each a hydrogen atom; $R_7$ and $R_{10}$ were each a $COOR_{12}$; $R_1$ and $R_{12}$ were each a methyl group; and $R_4$ was a binding site with Polymer (A), was synthesized according to the following scheme.

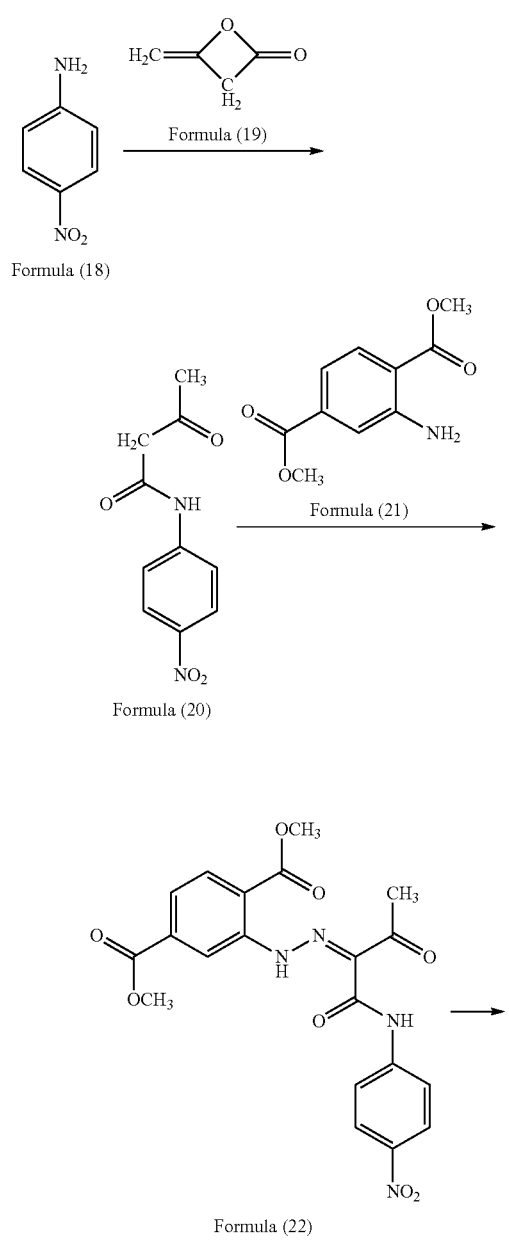

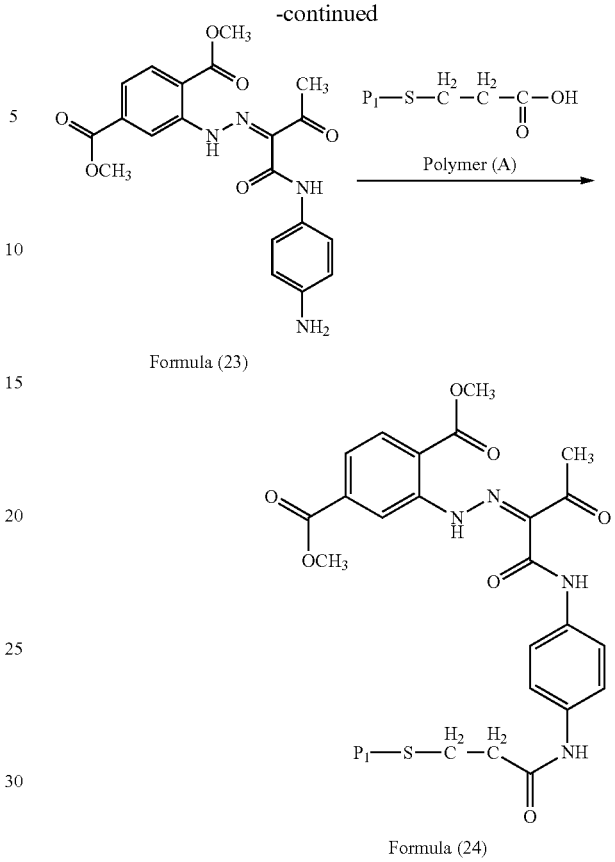

First, a compound (20) was synthesized using a compound (18) and a compound (19) as follows. 3.11 parts of the compound (18) was added to 30 parts of chloroform, and ice-cooled to 10° C. or lower, and 1.89 parts of the compound (19) was added thereto. Thereafter, the mixture was stirred at 65° C. for 2 hours. After the completion of the reaction, 4.80 parts of the compound (20) was obtained (yield: 96.0%) by extraction with chloroform and concentration.

Next, a compound (22) was synthesized using the compound (20) and a compound (21). 40.0 parts of methanol and 5.29 parts of concentrated hydrochloric acid were added to 4.25 parts of the compound (21), and ice-cooled to 10° C. or lower. To the solution, a solution in which 2.10 parts of sodium nitrite was dissolved in 6.00 parts of water was added, and allowed to react at the same temperature for 1 hour. Then, 0.990 part of sulfamic acid was added and stirred further for 20 min (diazonium salt solution). 70.0 parts of methanol and 4.51 parts of the compound (20) were added, and ice-cooled to 10° C. or lower; and the diazonium salt solution was added. Thereafter, a solution in which 5.83 parts of sodium acetate was dissolved in 7.00 parts of water was added, and allowed to react at 10° C. or lower for 2 hours. After the completion of the reaction, 300 parts of water was added and stirred for 30 min; thereafter, a solid was filtered off; and 8.65 parts of the compound (22) was obtained (yield: 96.1%) by purification by the recrystallization method from N,N-dimethylformamide.

Then, a compound (23) was synthesized using the compound (22). 8.58 parts of the compound (22) and 0.4 part of palladium-active carbon (palladium: 5%) were added to 150 parts of N,N-dimethylformamide, and stirred in a hydrogen gas atmosphere (reaction pressure: 0.1 to 0.4 MPa) at 40° C. for 3 hours. After the completion of the reaction, 7.00 parts of the compound (23) was obtained (yield: 87.5%) by filtration and concentration of the solution.

Then, an azo compound (24) was synthesized using a compound (23) and Polymer (A). 0.55 part of the compound (23) was added to 180 parts of dehydrated tetrahydrofuran, and heated to 80° C. to be dissolved. After the dissolution, the solution was cooled to 50° C.; 15.0 parts of Polymer (A) dissolved in 30 parts of dehydrated tetrahydrofuran was added; 0.38 part of a 1-ethyl-3-(3-dimethylaminopropyl)carbodiimide hydrochloride salt (EDC.HCl) was added and stirred at 50° C. for 5 hours; and the solution temperature was gradually returned to room temperature, and the solution was stirred over a night to complete the reaction. After the completion of the reaction, the solution was concentrated, and separated and extracted with chloroform, thereafter purified by a silica gel column chromatography, and then purified by reprecipitation with methanol to obtain the azo compound (24) (yield: 45.0%).

The analysis results are shown below.
[Analysis Results of the Azo Compound (24)]
[1] The result by GPC: the number-average molecular weight (Mn)=10,760
[2] The data analysis result of $^{13}$C-NMR (600 MHz, CDCl$_3$, room temperature) (see FIG. 1)
δ [ppm]=200.23, 166.23, 165.88, 161.07, 145.26, 143.81, 143.46, 135.28, 134.40, 133.47, 131.82, 128.63, 125.55, 123.84, 121.36, 120.71, 118.86, 116.88, 53.01, 52.78, 43.93, 40.27, 26.59
[3] The measurement result of the acid value: 0.24 mgKOH/g Synthesis Example 5

Synthesis of an Azo Compound (25)

Figure 2:
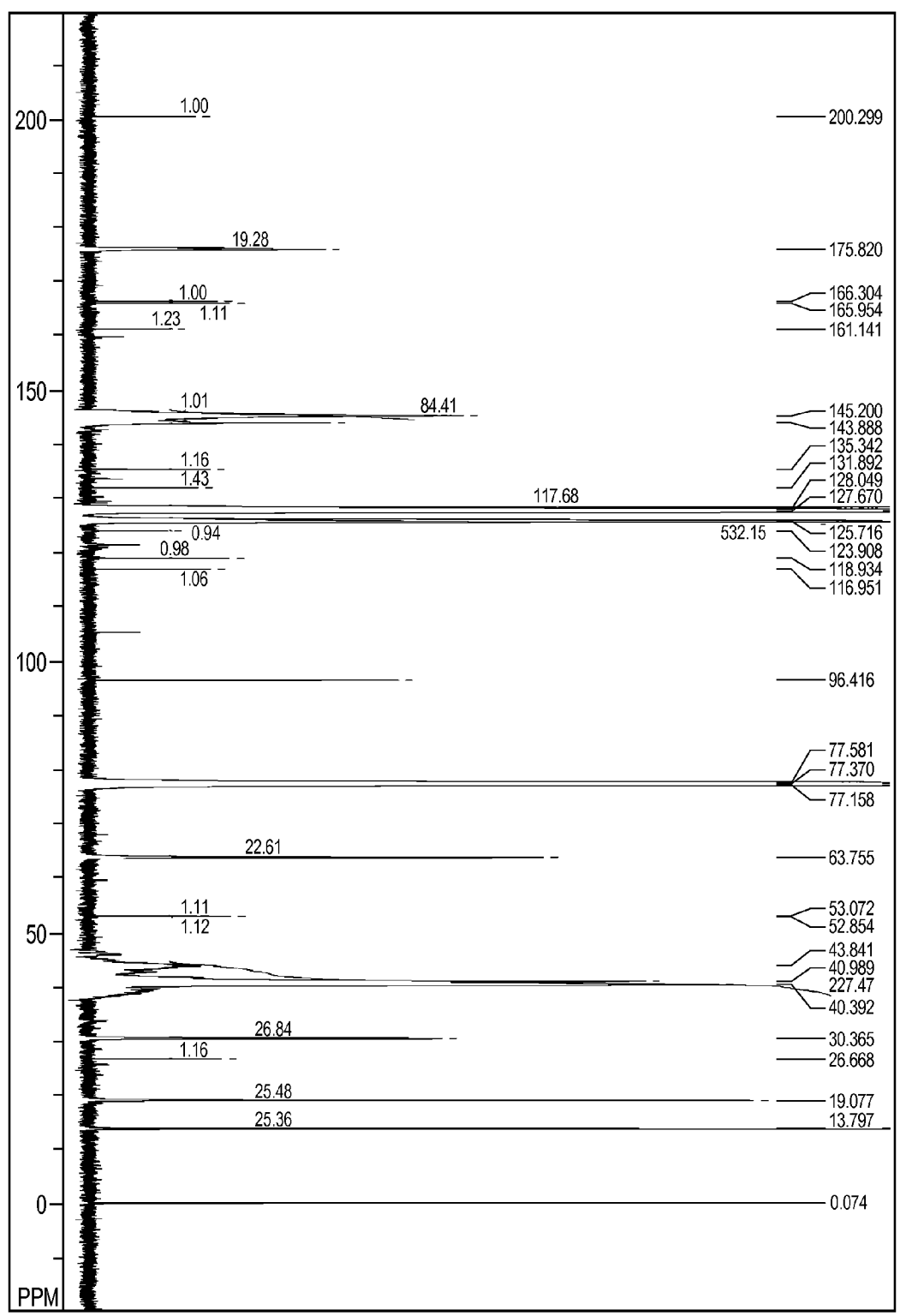
FIG. 2 is a $^{13}$C-NMR spectrum diagram of an azo compound (25) in the present invention.

An azo compound (25) was synthesized by the similar operations as in Synthesis Example 4, except for altering Polymer (A) in Synthesis Example 4 to Polymer (B).
[Analysis Results of the Azo Compound (25)]
[1] The result by GPC: the number-average molecular weight (Mn)=10,790
[2] The data analysis result of $^{13}$C-NMR (600 MHz, CDCl$_3$, room temperature) (see FIG. 2)
δ[ppm]=200.20, 175.83, 166.24, 165.91, 161.03, 159.65, 145.09, 143.81, 135.28, 133.46, 131.86, 127.61, 125.64, 123.85, 121.37, 120.72, 118.89, 116.94, 63.68, 53.00, 52.77, 43.74, 40.62, 30.30, 26.59, 18.99, 13.72
[3] The measurement result of the acid value: 0.15 mgKOH/g
Azo compounds (26) to (52) represented by the general formula (1) shown above were synthesized by the similar operations as in Synthesis Examples of the azo compounds (24) and (25) described above. A list of these Synthesis Examples is shown in the following Table 2, but synthesis examples are not limited to the examples described below. In the following Table 2, "Ph" denotes an unsubstituted phenyl group.

Comparative Example 1

Then, as comparative examples for the azo compound represented by the general formula (1) shown above according to the present invention, comparative compounds (a) and (b) described below were synthesized according to the synthesis method described above. In the comparative compound (a), Polymer (I) according to the present invention and the colorant site are bonded at a p-position of a phenyl group in $R_1$ in the general formula (1); and in the comparative compound (b), a polymer site and the colorant site are bonded at $R_9$ in the general formula (1). These comparative examples are shown in the following Table 2.

Comparative Compound (a)

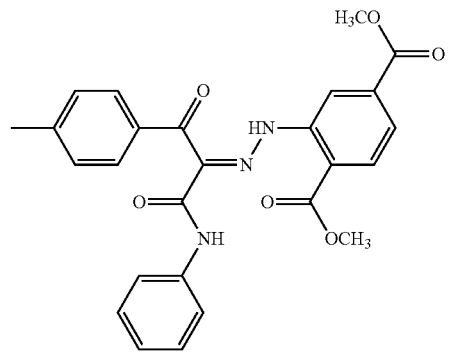

Polymer (I)

Comparative Compound (b)

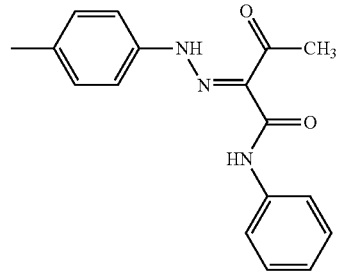

Polymer (B)

TABLE 2

| Azo Compound | $R_1$ | $R_2$ | $R_3$ | $R_4$ | $R_5$ | $R_6$ | $R_7$ | $R_8$ | $R_9$ | $R_{10}$ | $R_{11}$ |
|---|---|---|---|---|---|---|---|---|---|---|---|
| Azo compound (24) | CH$_3$ | H | H | Polymer (A) | H | H | COOCH$_3$ | H | H | COOCH$_3$ | H |
| Azo compound (25) | CH$_3$ | H | H | Polymer (B) | H | H | COOCH$_3$ | H | H | COOCH$_3$ | H |
| Azo compound (26) | CH$_3$ | H | H | Polymer (C) | H | H | COOCH$_3$ | H | H | COOCH$_3$ | H |
| Azo compound (27) | CH$_3$ | H | H | Polymer (D) | H | H | COOCH$_3$ | H | H | COOCH$_3$ | H |
| Azo compound (28) | CH$_3$ | H | H | Polymer (E) | H | H | COOCH$_3$ | H | H | COOCH$_3$ | H |

TABLE 2-continued

AZO COMPOUNDS

| Azo Compound | R$_1$ | R$_2$ | R$_3$ | R$_4$ | R$_5$ | R$_6$ | R$_7$ | R$_8$ | R$_9$ | R$_{10}$ | R$_{11}$ |
|---|---|---|---|---|---|---|---|---|---|---|---|
| Azo compound (29) | CH$_3$ | H | H | Polymer (G) | H | H | COOCH$_3$ | H | H | COOCH$_3$ | H |
| Azo compound (30) | CH$_3$ | H | H | H | Polymer (B) | H | COOCH$_3$ | H | H | COOCH$_3$ | H |
| Azo compound (31) | CH$_3$ | H | H | H | H | Polymer (Q) | COOCH$_3$ | H | H | COOCH$_3$ | H |
| Azo compound (32) | CH$_3$ | H | H | H | H | Polymer (B) | COOCH$_3$ | H | H | COOCH$_3$ | H |
| Azo compound (33) | C$_6$H$_{13}$ | H | H | Polymer (L) | H | H | COOCH$_3$ | H | H | COOCH$_3$ | H |
| Azo compound (34) | C$_6$H$_{13}$ | H | H | Polymer (M) | H | H | COOCH$_3$ | H | H | COOCH$_3$ | H |
| Azo compound (35) | C$_6$H$_{13}$ | H | H | Polymer (N) | H | H | COOCH$_3$ | H | H | COOCH$_3$ | H |
| Azo compound (36) | Ph | H | H | Polymer (I) | H | H | COOCH$_3$ | H | H | COOCH$_3$ | H |
| Azo compound (37) | Ph | H | H | Polymer (Q) | H | H | COOCH$_3$ | H | H | COOCH$_3$ | H |
| Azo compound (38) | Ph | H | H | Polymer (S) | H | H | COOCH$_3$ | H | H | COOCH$_3$ | H |
| Azo compound (39) | CH$_3$ | H | H | Polymer (F) | H | H | COOC$_2$H$_5$ | H | H | COOC$_2$H$_5$ | H |
| Azo compound (40) | CH$_3$ | H | H | Polymer (B) | H | H | COOC$_3$H$_7$ | H | H | COOC$_3$H$_7$ | H |
| Azo compound (41) | CH$_3$ | H | H | Polymer (J) | H | H | COOH | H | H | COOH | H |
| Azo compound (42) | CH$_3$ | H | H | Polymer (R) | H | H | CONH$_2$ | H | H | CONH$_2$ | H |
| Azo compound (43) | CH$_3$ | H | H | Polymer (R) | H | H | CONHCH$_3$ | H | H | CONHCH$_3$ | H |
| Azo compound (44) | CH$_3$ | H | H | Polymer (P) | H | H | CONHC$_2$H$_5$ | H | H | CONHC$_2$H$_5$ | H |
| Azo compound (45) | CH$_3$ | H | H | Polymer (R) | H | H | CONHC$_3$H$_7$ | H | H | CONHC$_3$H$_7$ | H |
| Azo compound (46) | CH$_3$ | H | H | Polymer (B) | H | H | CON(CH$_3$)$_2$ | H | H | CON(CH$_3$)$_2$ | H |
| Azo compound (47) | CH$_3$ | H | H | Polymer (D) | H | H | CON(CH$_3$)$_2$ | H | H | CON(CH$_3$)$_2$ | H |
| Azo compound (48) | CH$_3$ | H | H | Polymer (O) | H | H | CON(CH$_3$)$_2$ | H | H | CON(CH$_3$)$_2$ | H |
| Azo compound (49) | CH$_3$ | H | H | Polymer (K) | H | H | H | COOCH$_3$ | H | COOCH$_3$ | H |
| Azo compound (50) | CH$_3$ | H | H | Polymer (H) | H | H | COOCH$_3$ | H | H | H | H |
| Azo compound (51) | CH$_3$ | H | H | Polymer (K) | H | H | H | COOCH$_3$ | H | H | H |
| Azo compound (52) | CH$_3$ | H | H | Polymer (B) | H | H | H | H | COOCH$_3$ | H | H |
| Comparative compound (a) | 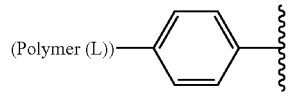 (Polymer (L))—〈phenyl〉— | H | H | H | H | H | COOCH$_3$ | H | H | COOCH$_3$ | H |
| Comparative compound (b) | CH$_3$ | H | H | H | H | H | H | H | H | Polymer (B) | H |

Example 2

The pigment dispersions according to the present invention were prepared by the following methods.

Preparation Example 1 of a Pigment Dispersion 18.0 parts of a pigment represented by the formula (5) shown above as an azo pigment, 3.6 parts of the azo compound (24) described above as a pigment dispersant, 180 parts of styrene as a water-insoluble solvent, and 130 parts of glass beads (1 mm in diameter) were mixed, dispersed for 3 hours by a paint shaker (made by Toyo Seiki Seisaku-sho, Ltd.), and filtered with a mesh to obtain a pigment dispersion (53).

Preparation Example 2 of Pigment Dispersions

Pigment dispersions (54) to (81) were obtained by the similar operations as in Preparation Example 1 of a pigment dispersion described above, except for altering the azo compound (24) to azo compounds (25) to (52), respectively.

Preparation Example 3 of a Pigment Dispersion

A pigment dispersion (82) was obtained by the similar operations as in Preparation Example 1 of a pigment dispersion described above, except for altering styrene to toluene.

Preparation Example 4 of Pigment Dispersions

Pigment dispersions (83) and (84) were obtained by the similar operations as in Preparation Example 1 of a pigment dispersion described above, except for altering the pigment represented by the formula (5) shown above to pigments represented by the following formulae (c) and (d), respectively.

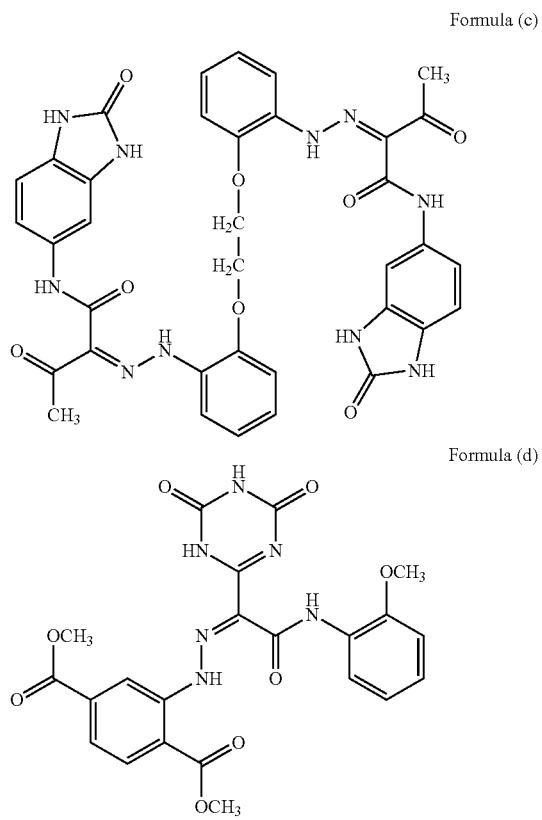

Formula (c)

Formula (d)

Preparation Example 5 of Pigment Dispersions

Pigment dispersions (85) and (86) were obtained by the similar operations as in Preparation Example 1 of a pigment dispersion described above, except for altering the azo compound (24) to the azo compound (25) and altering styrene to butyl acrylate and toluene, respectively.

Comparative Example 2

Pigment dispersions as referential values for evaluation, and comparative pigment dispersions were prepared by the following methods.

Preparation Example 1 of a Referential Pigment Dispersion

A referential pigment dispersion (87) was obtained by the similar operations as in Preparation Example 1 of a pigment dispersion in Example 2, except for adding no azo compound (24).

Preparation Example 2 of a Referential Pigment Dispersion

A referential pigment dispersion (88) was obtained by the similar operations as in Preparation Example 3 of a pigment dispersion in Example 2, except for adding no azo compound (24).

Preparation Example 3 of Referential Pigment Dispersions

Referential pigment dispersions (89) and (90) were obtained by the similar operations as in Preparation Example 4 of pigment dispersions in Example 2, except for adding no azo compound (24), respectively.

Preparation Example 4 of Referential Pigment Dispersions

Referential pigment dispersions (91) and (92) were obtained by the similar operations as in Preparation Example 5 of pigment dispersions in Example 2, except for adding no azo compound (25), respectively.

Preparation Example 1 of Comparative Pigment Dispersions

Comparative pigment dispersions (93), (94) and (95) were obtained by the similar operations as in Preparation Example 1 of a pigment dispersion in Example 2, except for altering the azo compound (24) to a polymeric dispersant described in Patent Literature 2, Solsperse 24000SC® (made by Lubrizol Corp.), and the comparative compounds (a) and (b) described above, respectively.

The pigment dispersions (53) to (86) and comparative pigment dispersions (93) to (95) using the azo compounds according to the present invention were evaluated by the following methods. The evaluation results of the kinds of the pigment dispersions, the kinds of the pigment dispersants, and the pigment dispersibility of the pigment dispersions are shown in Table 3.

<Evaluation of Pigment Dispersibility>

The evaluation of the pigment dispersibility by an azo compound was carried out by the gloss evaluation of coated films of the pigment dispersions described above. That is, a pigment dispersion was scooped up by a dropper, put as a straight line on a super art paper [Golden Cask Super Art, 180 kg, 80×160 (made by Oji Paper Co., Ltd.)], coated uniformly on the art paper by using a wire bar (#10), and measured for the gloss (reflection angle: 60°) after drying by using a glossimeter Gloss Meter VG2000 (made by Nippon Denshoku Industries Co., Ltd.). By utilizing the fact that a coated film was improved more in smoothness and improved more in gloss as a pigment was dispersed more finely, the gloss improvement factors of the coated films of the pigment dispersions (53) to (86) and the comparative pigment dispersions (93) to (95) described above were evaluated as follows using the glosses of the coated films of the pigment dispersions (87) to (92) described above, in which no pigment dispersant was added, as reference values.

A: the gloss improvement factor was 20% or more.
B: the gloss improvement factor was 10% or more and less than 20%.
C: the gloss was in a level of no change, or the gloss improvement factor was less than 10%.
D: the gloss was in a decreasing level.

If the gloss improvement factor was 10% or more, the pigment dispersibility was determined to be good.

TABLE 3

EVALUATION RESULTS OF PIGMENT DISPERSIONS USING THE
AZO COMPOUNDS ACCORDING TO THE PRESENT INVENTION

| Pigment Dispersion | Azo Compound | Water-Insoluble Solvent | Pigment | Gloss Improvement Factor/Evaluation |
|---|---|---|---|---|
| Pigment dispersion (53) | Azo compound (24) | Styrene | Formula (5) | 23.7/A |
| Pigment dispersion (54) | Azo compound (25) | Styrene | Formula (5) | 22.1/A |
| Pigment dispersion (55) | Azo compound (26) | Styrene | Formula (5) | 20.9/A |
| Pigment dispersion (56) | Azo compound (27) | Styrene | Formula (5) | 20.8/A |
| Pigment dispersion (57) | Azo compound (28) | Styrene | Formula (5) | 24.5/A |
| Pigment dispersion (58) | Azo compound (29) | Styrene | Formula (5) | 18.9/B |
| Pigment dispersion (59) | Azo compound (30) | Styrene | Formula (5) | 22.2/A |
| Pigment dispersion (60) | Azo compound (31) | Styrene | Formula (5) | 25.3/A |
| Pigment dispersion (61) | Azo compound (32) | Styrene | Formula (5) | 24.0/A |
| Pigment dispersion (62) | Azo compound (33) | Styrene | Formula (5) | 25.5/A |
| Pigment dispersion (63) | Azo compound (34) | Styrene | Formula (5) | 22.3/A |
| Pigment dispersion (64) | Azo compound (35) | Styrene | Formula (5) | 25.1/A |
| Pigment dispersion (65) | Azo compound (36) | Styrene | Formula (5) | 23.4/A |
| Pigment dispersion (66) | Azo compound (37) | Styrene | Formula (5) | 23.6/A |
| Pigment dispersion (67) | Azo compound (38) | Styrene | Formula (5) | 22.8/A |
| Pigment dispersion (68) | Azo compound (39) | Styrene | Formula (5) | 21.9/A |
| Pigment dispersion (69) | Azo compound (40) | Styrene | Formula (5) | 24.2/A |
| Pigment dispersion (70) | Azo compound (41) | Styrene | Formula (5) | 17.6/B |
| Pigment dispersion (71) | Azo compound (42) | Styrene | Formula (5) | 18.8/B |
| Pigment dispersion (72) | Azo compound (43) | Styrene | Formula (5) | 21.4/A |
| Pigment dispersion (73) | Azo compound (44) | Styrene | Formula (5) | 20.9/A |
| Pigment dispersion (74) | Azo compound (45) | Styrene | Formula (5) | 20.5/A |
| Pigment dispersion (75) | Azo compound (46) | Styrene | Formula (5) | 21.7/A |
| Pigment dispersion (76) | Azo compound (47) | Styrene | Formula (5) | 24.1/A |
| Pigment dispersion (77) | Azo compound (48) | Styrene | Formula (5) | 23.0/A |
| Pigment dispersion (78) | Azo compound (49) | Styrene | Formula (5) | 21.6/A |
| Pigment dispersion (79) | Azo compound (50) | Styrene | Formula (5) | 19.4/B |
| Pigment dispersion (80) | Azo compound (51) | Styrene | Formula (5) | 18.5/B |
| Pigment dispersion (81) | Azo compound (52) | Styrene | Formula (5) | 24.9/A |
| Pigment dispersion (82) | Azo compound (24) | Toluene | Formula (5) | 20.6/A |
| Pigment dispersion (83) | Azo compound (24) | Styrene | Formula (c) | 20.4/A |
| Pigment dispersion (84) | Azo compound (24) | Styrene | Formula (d) | 23.3/A |
| Pigment dispersion (85) | Azo compound (25) | Butyl acrylate | Formula (5) | 25.8/A |
| Pigment dispersion (86) | Azo compound (25) | Toluene | Formula (5) | 18.8/B |
| Referential pigment dispersion (87) | none | Styrene | Formula (5) | — |
| Referential pigment dispersion (88) | none | Toluene | Formula (5) | — |
| Referential pigment dispersion (89) | none | Styrene | Formula (c) | — |
| Referential pigment dispersion (90) | none | Styrene | Formula (d) | — |
| Referential pigment dispersion (91) | none | Butyl acrylate | Formula (5) | — |
| Referential pigment dispersion (92) | none | Toluene | Formula (5) | — |
| Comparative pigment dispersion (93) | Solsperse2400SC | Styrene | Formula (5) | −4.9/D |
| Comparative pigment dispersion (94) | Comparative compound (a) | Styrene | Formula (5) | 7.7/C |
| Comparative pigment dispersion (95) | Comparative compound (b) | Styrene | Formula (5) | −3.9/D |

From Table 3, it is found that any of the pigment dispersions (53) to (86) using the azo compounds (24) to (52) according to the present invention exhibited more improved pigment dispersibility than the referential pigment dispersions (87) to (92). From this result, it is confirmed that the azo compound according to the present invention is useful as a pigment dispersant.

By contrast, it is found that the comparative pigment dispersion (93) using a polymeric dispersant described in Patent Literature 2 described above as a pigment dispersant, Solsperse 24000SC® (made by Lubrizol Corp.), was decreased in the pigment dispersibility. From this result, it can be said that the pigment dispersion according to the present invention had an effect of more improving the dispersibility of the pigment represented by the formula (5) shown above than the polymeric dispersant described in Patent Literature 2 described above.

From the comparison of the pigment dispersions (58), (59) and (61) using the azo compounds (29), (30) and (32) according to the present invention with the comparative pigment dispersion (94) using the comparative compound (a) and the comparative pigment dispersion (95) using the comparative compound (b), it is suggested that as the binding sites of the copolymers, $R_2$ to $R_6$ in the general formula (1) shown above are best.

Preparation Example 6 of a Pigment Dispersion 42.0 parts of the pigment represented by the formula (5) shown above as an azo pigment and 8.4 parts of the azo compound (24) described above as a pigment dispersant were dry mixed by a hybridization system, NHS-0 (made by Nara Machinery Co., Ltd.) to prepare a pigment composition. 18.0 parts of the obtained pigment composition was mixed with 180 parts of styrene and 130 parts of glass beads (1 mm in diameter), and dispersed by a paint shaker (made by Toyo Seiki Seisaku-sho, Ltd.) for one hour, and filtered with a mesh to obtain a pigment dispersion.

The obtained pigment dispersion was evaluated for the pigment dispersibility as described above, and it was confirmed that the good pigment dispersibility was acquired similarly.

Example 3

Production Example 1 of a Yellow Toner (Preparation of an Aqueous Dispersion Medium)

710 parts of ion exchange water and 450 parts of a 0.1-mol/L $Na_3PO_4$ aqueous solution were added in a 2-L four-necked flask equipped with a high-speed stirrer TK Homo Mixer (made by Primix Corp.), whose rotation frequency was regulated at 12,000 rpm, and the mixture was heated at 60° C. parts of a 1.0-mol/L $CaCl_2$ aqueous solution was gradually added thereto to prepare an aqueous dispersion medium containing $Ca_3(PO_4)_2$ as a fine hardly water-soluble dispersion stabilizer.

(Suspension Polymerization Step)

| | |
|---|---|
| The pigment dispersion (53) in Example 2 | 132 parts |
| Styrene monomer | 46 parts |
| n-Butyl acrylate monomer | 34 parts |
| A polar resin [a polycondensate of a propylene oxide-modified bisphenol A and isophthalic acid (the glass transition temperature = 65° C., Mw = 10,000, Mn = 6,000)] | 10 parts |
| An ester wax (the maximum endothermal peak temperature in DSC measurement = 70° C., Mn = 704) | 25 parts |
| An aluminum salicylate compound [Bontron E-88 (made by Orient Chemical Industries, Ltd.)] | 2 parts |
| Divinylbenzene monomer | 0.1 part |

The composition described above was heated at 60° C., and homogeneously dissolved and dispersed using a TK Homo Mixer at 5,000 rpm. 10 parts of 2,2'-azobis(2,4-dimethylvaleronitrile) as a polymerization initiator was dissolved therein to prepare a polymerizable monomer composition. The polymerizable monomer composition was charged in the aqueous medium described above, and granulated for 15 min while the rotation frequency was maintained at 12,000 rpm. Thereafter, the stirrer was altered from the high-speed stirrer to propeller stirring blades, and the polymerization was continued at a liquid temperature of 60° C. for 5 hours; and thereafter, the liquid temperature was raised to 80° C., and the polymerization was continued for 8 hours. After the completion of the polymerization reaction, the remaining monomers were distilled out at 80° C. under reduced pressure, and the resultant was then cooled to 30° C. to obtain a polymer fine particle dispersion liquid.

Then, the polymer fine particle dispersion liquid was transferred to a cleaning vessel; a dilute hydrochloric acid was added under stirring to the dispersion liquid, which was stirred at pH of 1.5 for 2 hours to dissolve a compound of phosphoric acid and calcium containing $Ca_3(PO_4)_2$; and thereafter, the dispersion liquid was subjected to a solid-liquid separation by a filter to obtain polymer fine particles. This was charged in water, and stirred to again make a dispersion liquid, which was then subjected to a solid-liquid separation by a filter. The redispersion of the polymer fine particles in water and the solid-liquid separation were repeated until the compound of phosphoric acid and calcium containing $Ca_3(PO_4)_2$ was sufficiently removed. Thereafter, the polymer fine particles finally having been subjected to the solid-liquid separation was fully dried in a drier to obtain yellow toner particles.

100 parts of the yellow toner particles obtained in the step described above was dry mixed with 1.8 parts of a hydrophobized silica fine powder having a specific surface area of 200 $m^2/g$ as measured by BET method by a Henschel mixer (made by Nippon Coke & Engineering Co., Ltd.) to obtain a yellow toner (96).

Production Example 2 of Yellow Toners

Yellow toners (97) to (127) were obtained by the similar operations as in Production Example 1 of a yellow toner, except for altering the pigment dispersion (53) to the pigment dispersions (54) to (81), and (83) to (85), respectively.

Production Example 3 of a Yellow Toner

Preparation of a Pigment Dispersion

| | |
|---|---|
| Ethyl acetate | 180 parts |
| The coloring agent of the formula (5) shown above | 12 parts |
| The azo compound (24) | 2.4 parts |

The mixture described above was dispersed for 3 hours by an attritor (made by Nippon Coke & Engineering Co., Ltd.) to prepare a pigment dispersion liquid.

(Mixing Step)

| | |
|---|---|
| The pigment dispersion described above | 96.0 parts |
| A polar resin [saturated polyester (a polycondensate of a propylene oxide-modified bisphenol A and phthalic acid, Tg = 75.9° C., Mw = 11,000, Mn = 4,200, and the acid value = 11 mgKOH/g)] | 85.0 parts |
| A hydrocarbon wax (a Fischer-Tropsch wax, the maximum endothermic peak in DSC measurement = 80° C., and Mw = 750) | 9.0 parts |
| An aluminum salicylate compound [Bontron E-88 (made by Orient Chemical Industries, Ltd.)] | 2.0 parts |
| Ethyl acetate (solvent) | 10.0 parts |

The composition described above was dispersed for 24 hours in a ball mill to obtain 200 parts of a toner composition mixed liquid.

(Dispersion Suspension Step)

| | |
|---|---|
| Calcium carbonate (coated with an acrylic copolymer) | 20.0 parts |
| A carboxymethylcellulose [Cellogen BS-H ® (made by Daiichi Kogyo Seiyaku Co., Ltd.)] | 0.5 parts |
| Ion exchange water | 99.5 parts |

The composition described above was dispersed for 24 hours in a ball mill to dissolve the carboxymethylcellulose, to thereby obtain an aqueous medium. 1,200 parts of the aqueous medium was charged in a TK Homo Mixer; 1,000 parts of the toner composition mixed liquid described above was charged while the aqueous medium was being stirred by the rotation blades of the stirrer at a peripheral speed of 20 m/sec, and stirred for 1 min with the temperature being maintained at a constant of 25° C., to thereby obtain a suspension.

(Solvent Removal Step)

While 2,200 parts of the suspension obtained in the dispersion suspension step was being stirred by a Fullzone impeller (made by Kobelco Eco-Solutions Co., Ltd.) at a peripheral speed of 45 m/min, and the temperature was being kept constant at 40° C., the gas phase above the suspension surface was forcibly renewed by using a blower to start removing the solvent. At 15 min after the start of the solvent removal, 75 parts of an ammonia water diluted to 1% as an ionic substance was added; then at 1 hour after the start of the solvent removal, 25 parts of the ammonia water was added; then, at 2 hours after the start of the solvent removal, 25 parts of the ammonia water was added; and finally, at 3 hours after the start of the solvent removal, 25 parts of the ammonia water was added, wherein the total addition amount of the ammonia water was 150 parts. Further with the liquid temperature being maintained at 40° C., the suspension was held for 17 hours after the start of the solvent removal to thereby obtain a toner dispersion liquid in which the solvent (ethyl acetate) had been removed from suspension particles.

(Cleaning and Dehydration Step)

80 parts of a 10-mol/l hydrochloric acid was added to 300 parts of the toner dispersion liquid obtained in the solvent removal step, and further subjected to a neutralization treatment with a 0.1-mol/l sodium hydroxide aqueous solution; and thereafter, cleaning with ion exchange water by suction filtration was repeated four times to obtain a toner cake. The obtained toner cake was dried by a vacuum drier, and screened by a sieve having a sieve opening of 45 μm to thereby obtain yellow toner particles. The subsequent steps were carried out as in Production Example 1 of a yellow toner described above to thereby obtain a yellow toner (128).

Production Example 4 of Yellow Toners

Yellow toners (129) and (130) were obtained by the similar operations as in Production Example 3 of a yellow toner, except for altering the azo compound (24) to the azo compounds (26) and (30), respectively.

Comparative Example 3

Yellow toners as referential values for evaluation, and comparative yellow toners were produced by the following methods.

Production Example 1 of Referential Yellow Toners

Referential yellow toners (131) to (134) were obtained by the similar operations as in Production Example 1 of a yellow toner in Example 3, except for altering the pigment dispersion (53) used to the pigment dispersions (87), (89) to (91), respectively.

Production Example 2 of a Referential Yellow Toner

A referential yellow toner (135) was obtained by the similar operations as in Production Example 3 of a yellow toner in Example 3, except for adding no azo compound (24).

Production Example 1 of Comparative Yellow Toners

Comparative yellow toners (136) to (138) were obtained by the similar operations as in Production Example 1 of a yellow toner in Example 3, except for altering the pigment dispersion (53) used to the pigment dispersions (93) to (95), respectively.

Production Example 2 of Comparative Yellow Toners

Comparative yellow toners (139), (140) and (141) were obtained by the similar operations as in Production Example 3 of a yellow toner in Example 3, except for altering the azo compound (24) to a polymer dispersant described in Patent Literature 2, Solsperse 24000SC® (made by Lubrizol Corp.), and the comparative compounds (a) and (b) described above, respectively.

The yellow toners obtained in the present invention were evaluated by the following method. The kinds of the yellow toners, and the evaluation results of the color tone of the yellow toners are shown in Table 4.

Evaluation Examples of the Color Tone of the Yellow Toners

For the yellow toners (95) to (141), 95 parts of a ferrite carrier coated with an acrylic resin was mixed with 5 parts of the each yellow toner to make a developer. The image output was carried out using a color copying machine (from which the fixing oil-coating mechanism had been dismounted), a CLC-1100 remodeled machine (made by Canon Corp.), under the environment of a temperature of 25° C. and a humidity of 60% RH. Then, the image was measured for $L^*$ and $C^*$ in the $L^*a^*b^*$ colorimetric system prescribed by Commission Internationale del'Eclairage by using a reflective densitometer, Spectrolino (made by GretagMacbeth Co.) under the conditions of a light source of D50 and a visual field of 2°. An improvement factor of $C^*$ at $L^*=95.5$ of a corresponding yellow toner image was evaluated as follows, based on an image of a yellow toner containing no pigment dispersant.

A: the improvement factor of $C^*$ was 5% or more.

B: the improvement factor of $C^*$ was 1% or more and less than 5%.

C: $C^*$ was not improved, or the improvement factor was less than 1%.

D: the value of $C^*$ decreased.

TABLE 4

EVALUATION RESULTS OF YELLOW TONERS ACCORDING TO THE PRESENT INVENTION,
AND EVALUATION RESULTS OF REFERENTIAL AND COMPARATIVE YELLOW TONERS

| Yellow Toner | Azo Compound | Toner Production Method | Chroma Improvement Factor %/Evaluation |
|---|---|---|---|
| Yellow toner (96) | Azo compound (24) | Suspension polymerization method | 8.5/A |
| Yellow toner (97) | Azo compound (25) | Suspension polymerization method | 7.2/A |
| Yellow toner (98) | Azo compound (26) | Suspension polymerization method | 7.1/A |
| Yellow toner (99) | Azo compound (27) | Suspension polymerization method | 6.9/A |
| Yellow toner (100) | Azo compound (28) | Suspension polymerization method | 8.2/A |
| Yellow toner (101) | Azo compound (29) | Suspension polymerization method | 4.5/B |
| Yellow toner (102) | Azo compound (30) | Suspension polymerization method | 6.3/A |
| Yellow toner (103) | Azo compound (31) | Suspension polymerization method | 5.8/A |
| Yellow toner (104) | Azo compound (32) | Suspension polymerization method | 9.0/A |
| Yellow toner (105) | Azo compound (33) | Suspension polymerization method | 6.8/A |
| Yellow toner (106) | Azo compound (34) | Suspension polymerization method | 5.5/A |
| Yellow toner (107) | Azo compound (35) | Suspension polymerization method | 5.9/A |
| Yellow toner (108) | Azo compound (36) | Suspension polymerization method | 7.0/A |
| Yellow toner (109) | Azo compound (37) | Suspension polymerization method | 8.2/A |
| Yellow toner (110) | Azo compound (38) | Suspension polymerization method | 8.6/A |
| Yellow toner (111) | Azo compound (39) | Suspension polymerization method | 7.8/A |
| Yellow toner (112) | Azo compound (40) | Suspension polymerization method | 5.6/A |
| Yellow toner (113) | Azo compound (41) | Suspension polymerization method | 3.8/B |
| Yellow toner (114) | Azo compound (42) | Suspension polymerization method | 4.1/B |
| Yellow toner (115) | Azo compound (43) | Suspension polymerization method | 8.8/A |
| Yellow toner (116) | Azo compound (44) | Suspension polymerization method | 6.9/A |
| Yellow toner (117) | Azo compound (45) | Suspension polymerization method | 6.6/A |
| Yellow toner (118) | Azo compound (46) | Suspension polymerization method | 5.3/A |
| Yellow toner (119) | Azo compound (47) | Suspension polymerization method | 8.0/A |
| Yellow toner (120) | Azo compound (48) | Suspension polymerization method | 7.5/A |
| Yellow toner (121) | Azo compound (49) | Suspension polymerization method | 6.0/A |
| Yellow toner (122) | Azo compound (50) | Suspension polymerization method | 4.4/B |
| Yellow toner (123) | Azo compound (51) | Suspension polymerization method | 4.4/B |
| Yellow toner (124) | Azo compound (52) | Suspension polymerization method | 9.1/A |
| Yellow toner (125) | Azo compound (24) | Suspension polymerization method | 8.7/A |
| Yellow toner (126) | Azo compound (24) | Suspension polymerization method | 6.4/A |
| Yellow toner (127) | Azo compound (25) | Suspension polymerization method | 6.5/A |
| Yellow toner (128) | Azo compound (24) | Suspension granulation method | 7.0/A |
| Yellow toner (129) | Azo compound (26) | Suspension granulation method | 6.2/A |
| Yellow toner (130) | Azo compound (30) | Suspension granulation method | 6.1/A |
| Referential yellow toner (131) | none | Suspension polymerization method | — |
| Referential yellow toner (132) | none | Suspension polymerization method | — |
| Referential yellow toner (133) | none | Suspension polymerization method | — |
| Referential yellow toner (134) | none | Suspension polymerization method | — |
| Referential yellow toner (135) | none | Suspension granulation method | — |
| Comparative yellow toner (136) | Solsperse2400SC | Suspension polymerization method | −2.2/D |
| Comparative yellow toner (137) | Comparative compound (a) | Suspension polymerization method | 0.7/C |
| Comparative yellow toner (138) | Comparative compound (b) | Suspension polymerization method | −5.3/D |
| Comparative yellow toner (139) | Solsperse2400SC | Suspension granulation method | −4.9/D |
| Comparative yellow toner (140) | Comparative compound (a) | Suspension granulation method | 0.1/C |
| Comparative yellow toner (141) | Comparative compound (b) | Suspension granulation method | 0.6/C |

From Table 4, it is found that toners using the azo compounds according to the present invention as a pigment dispersant had high chroma and good color tone. From this, it is confirmed that the azo compounds according to the present invention are useful as an azo pigment dispersant for a toner.

INDUSTRIAL APPLICABILITY

With respect to the practical usage examples of the present invention, the azo compounds according to the present invention can be applied to various types of applications, which are not limited to applications as the pigment dispersants described in the present description, and include the usage as toners for electrostatic image development, inkjet inks, thermosensitive transfer recording sheets, coloring agents for color filters and colorants for optical recording media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims the priority to Japanese Patent Application No. 2010-199927, filed on Sep. 7, 2010, the subject of which is part of the present application herein by reference.

What is claimed is:

1. An azo compound represented by the following general formula (1):

General Formula (1)

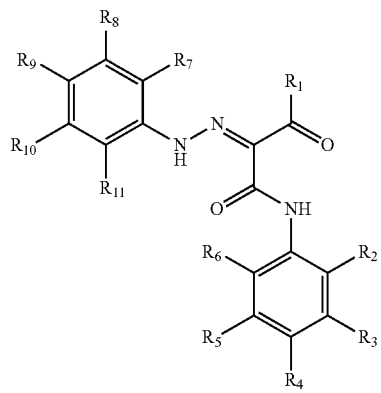

wherein $R_1$ denotes an alkyl group having 1 to 6 carbon atoms, or a phenyl group; $R_2$ to $R_6$ each denote a hydrogen atom, or a substituent represented by the following general formula (2), and at least one of $R_2$ to $R_6$ is a substituent represented by the following general formula (2); $R_7$ to $R_{11}$ each denote a hydrogen atom, a $COOR_{12}$ group, or a $CONR_{13}R_{14}$ group, and at least one of $R_7$ to $R_{11}$ is a $COOR_{12}$ group, or a $CONR_{13}R_{14}$ group; and $R_{12}$ to $R_{14}$ each denote a hydrogen atom, or an alkyl group having 1 to 3 carbon atoms:

General Formula (2)

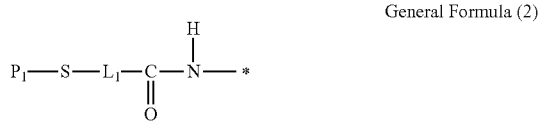

wherein $P_1$ denotes a polymeric component; $L_1$ denotes an alkylene group having 1 to 3 carbon atoms or an arylene group having 6 to 10 carbon atoms; and * denotes a binding site.

2. The azo compound according to claim 1, wherein $P_1$ in the general formula (2) is a polymeric component comprising at least a monomer unit represented by the following general formula (3) or the following general formula (4):

General Formula (3)

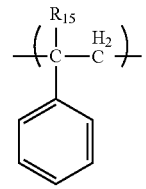

wherein $R_{15}$ denotes a hydrogen atom or an alkyl group having 1 or 2 carbon atoms, and General Formula (4)

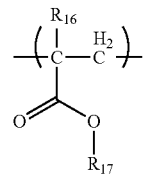

wherein $R_{16}$ denotes a hydrogen atom or an alkyl group having 1 or 2 carbon atoms; and $R_{17}$ denotes an alkyl group having 1 to 22 carbon atoms or an aralkyl group having 7 or 8 carbon atoms.

3. The azo compound according to claim 1, wherein $R_1$ in the general formula (1) is a methyl group.

4. The azo compound according to claim 1, wherein $R_7$ and $R_{10}$ in the general formula (1) are each a $COOR_{12}$ group; and $R_8$, $R_9$ and $R_{11}$ therein are each a hydrogen atom.

5. A pigment dispersant, comprising an azo compound according to claim 1.

6. A pigment composition, comprising an azo compound according to claim 1, and an azo pigment.

7. The pigment composition according to claim 6, wherein the azo pigment is an acetoacetanilide-based pigment.

8. The pigment composition according to claim 6, wherein the azo pigment is represented by the formula (5):

General Formula (5)

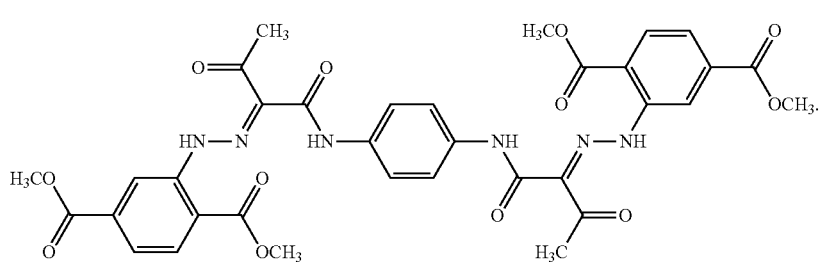

9. A pigment dispersion, comprising an azo compound according to claim 1, an azo pigment and a water-insoluble solvent.

10. A toner, comprising a toner particle comprising a binder resin, an azo compound according to claim 1, an azo pigment and a wax component.

11. The toner according to claim 10, wherein the toner particle is produced by using a suspension polymerization method or a suspension granulation method.

* * * * *